United States Patent
Wong et al.

(10) Patent No.: US 10,983,987 B2
(45) Date of Patent: Apr. 20, 2021

(54) NAVIGATION SYSTEM WITH UPDATE MECHANISM AND METHOD OF OPERATION THEREOF

(71) Applicant: Telenav, Inc., Santa Clara, CA (US)

(72) Inventors: Shannph Simon Wong, Foster City, CA (US); John Andrew Michael Novak, Menlo Park, CA (US); Harald Koertge, Berlin (DE); Stefan C. Karschti, Cluj Napoca (RO); Xun Liu, San Jose, CA (US); Vladimir Lemberg, Saratoga, CA (US); Md Ahsan Habib, Santa Clara, CA (US)

(73) Assignee: Telenav, Inc., Santa Clara, CA (US)

( * ) Notice: Subject to any disclaimer, the term of this patent is extended or adjusted under 35 U.S.C. 154(b) by 212 days.

(21) Appl. No.: 15/863,699

(22) Filed: Jan. 5, 2018

(65) Prior Publication Data
US 2019/0213272 A1    Jul. 11, 2019

(51) Int. Cl.
*G06F 16/20* (2019.01)
*G06F 16/23* (2019.01)
*G01C 21/34* (2006.01)
*G06F 16/29* (2019.01)

(52) U.S. Cl.
CPC ......... *G06F 16/2379* (2019.01); *G01C 21/34* (2013.01); *G06F 16/29* (2019.01)

(58) Field of Classification Search
None
See application file for complete search history.

(56) References Cited

U.S. PATENT DOCUMENTS

| | | | | |
|---|---|---|---|---|
| 5,951,620 A | * | 9/1999 | Ahrens | G01C 21/26 701/450 |
| 7,197,500 B1 | * | 3/2007 | Israni | G01C 21/32 340/995.14 |
| 2003/0097327 A1 | * | 5/2003 | Anaya | G06Q 40/00 705/37 |
| 2008/0266205 A1 | * | 10/2008 | Moehring | G06F 1/1632 345/1.2 |
| 2011/0022812 A1 | * | 1/2011 | van der Linden | H04L 67/1097 711/163 |
| 2012/0011101 A1 | * | 1/2012 | Fang | H04L 69/04 707/654 |
| 2012/0290529 A1 | * | 11/2012 | Baleedpalli | G06F 16/23 707/609 |
| 2014/0201332 A1 | * | 7/2014 | Kataoka | H04L 67/1008 709/219 |
| 2014/0223423 A1 | * | 8/2014 | Alsina | G06F 8/65 717/173 |
| 2014/0380299 A1 | * | 12/2014 | Nakamura | G06F 8/65 717/173 |
| 2017/0064609 A1 | * | 3/2017 | Park | H04L 12/189 |

* cited by examiner

*Primary Examiner* — Jau Shya Meng
(74) *Attorney, Agent, or Firm* — Perspectives Law Group, Corp.

(57) ABSTRACT

A method of operation of a navigation system includes: receiving a navigation external data including a vendor data, a delta data, or a combination thereof; generating a normalization data with a control unit based on transforming the navigation external data according to universal format; generating an aggregation changeset data by splitting the normalization data into each instance of a dimension type; and updating a navigation local data by applying the aggregation changeset data according to a layer prioritization for presenting the navigation local data on a device.

20 Claims, 8 Drawing Sheets

NAVIGATION SYSTEM WITH UPDATE MECHANISM AND METHOD OF OPERATION THEREOF

TECHNICAL FIELD

The present invention relates generally to a navigation system, and more particularly to a system with update mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system improving update mechanism to control the updating of data has become a paramount concern for the consumer. The inability decreases the benefit of using the tool.

Thus, a need still remains for a navigation system with update mechanism to manage updating of data. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: receiving a navigation external data including a vendor data, a delta data, or a combination thereof; generating a normalization data with a control unit based on transforming the navigation external data according to universal format; generating an aggregation changeset data by splitting the normalization data into each instance of a dimension type; and updating a navigation local data by applying the aggregation changeset data according to a layer prioritization for presenting the navigation local data on a device.

The present invention provides a navigation system, including: a communication unit for receiving a navigation external data including a vendor data, a delta data, or a combination thereof; and a control unit, coupled to the communication unit, for: generating a normalization data based on transforming the navigation external data according to universal format; generating an aggregation changeset data by splitting the normalization data into each instance of a dimension type; and updating a navigation local data by applying the aggregation changeset data according to a layer prioritization for presenting the navigation local data on a device.

The present invention provides a navigation system having a non-transitory computer readable medium including instructions for execution, the instructions comprising: receiving a navigation external data including a vendor data, a delta data, or a combination thereof; generating a normalization data based on transforming the navigation external data according to universal format; generating an aggregation changeset data by splitting the normalization data into each instance of a dimension type; and updating a navigation local data by applying the aggregation changeset data according to a layer prioritization for presenting the navigation local data on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
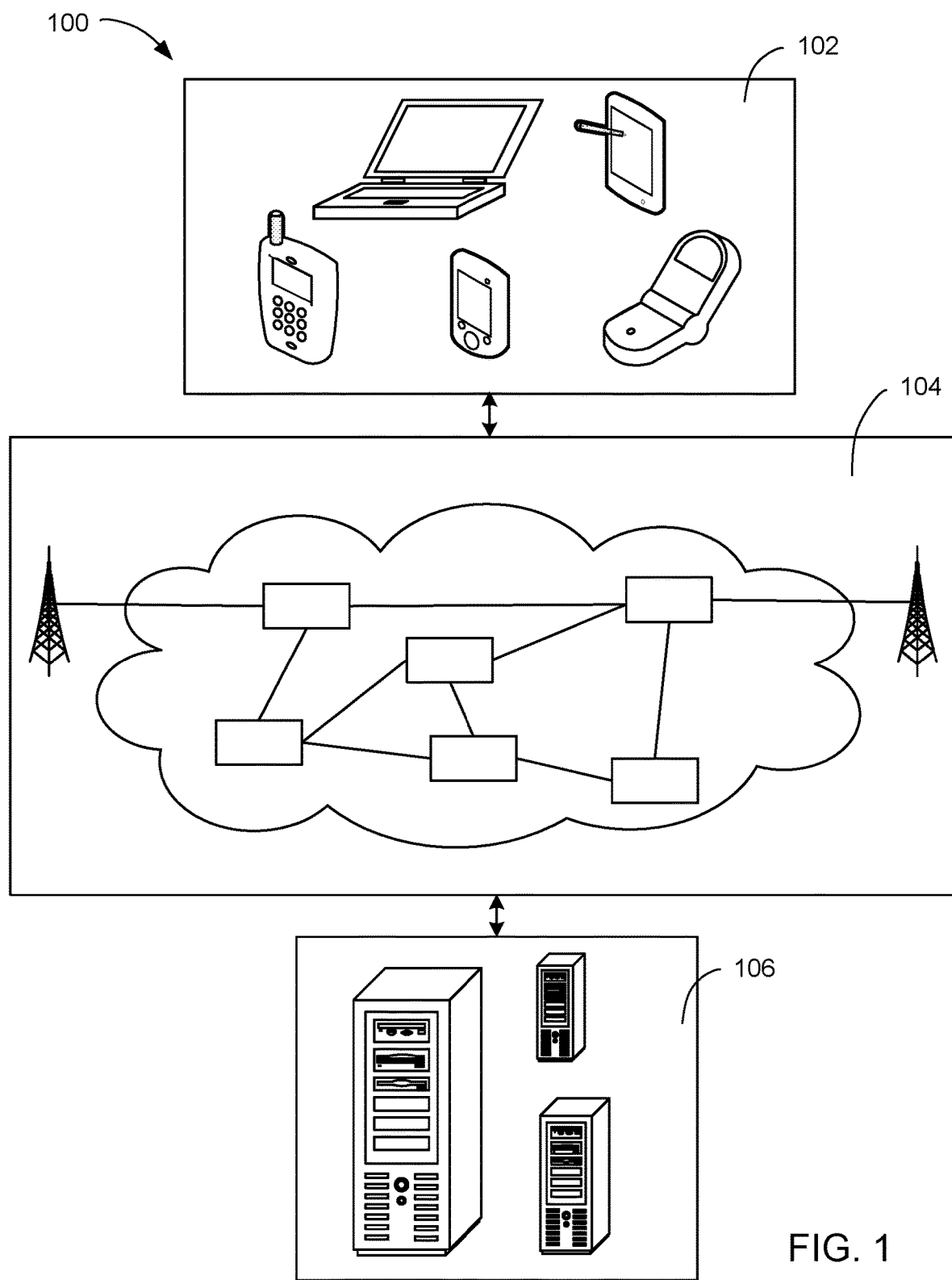
FIG. 1 is a navigation system with update mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

Referring now to FIG. 1, therein is shown a navigation system 100 with update mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, a head unit, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
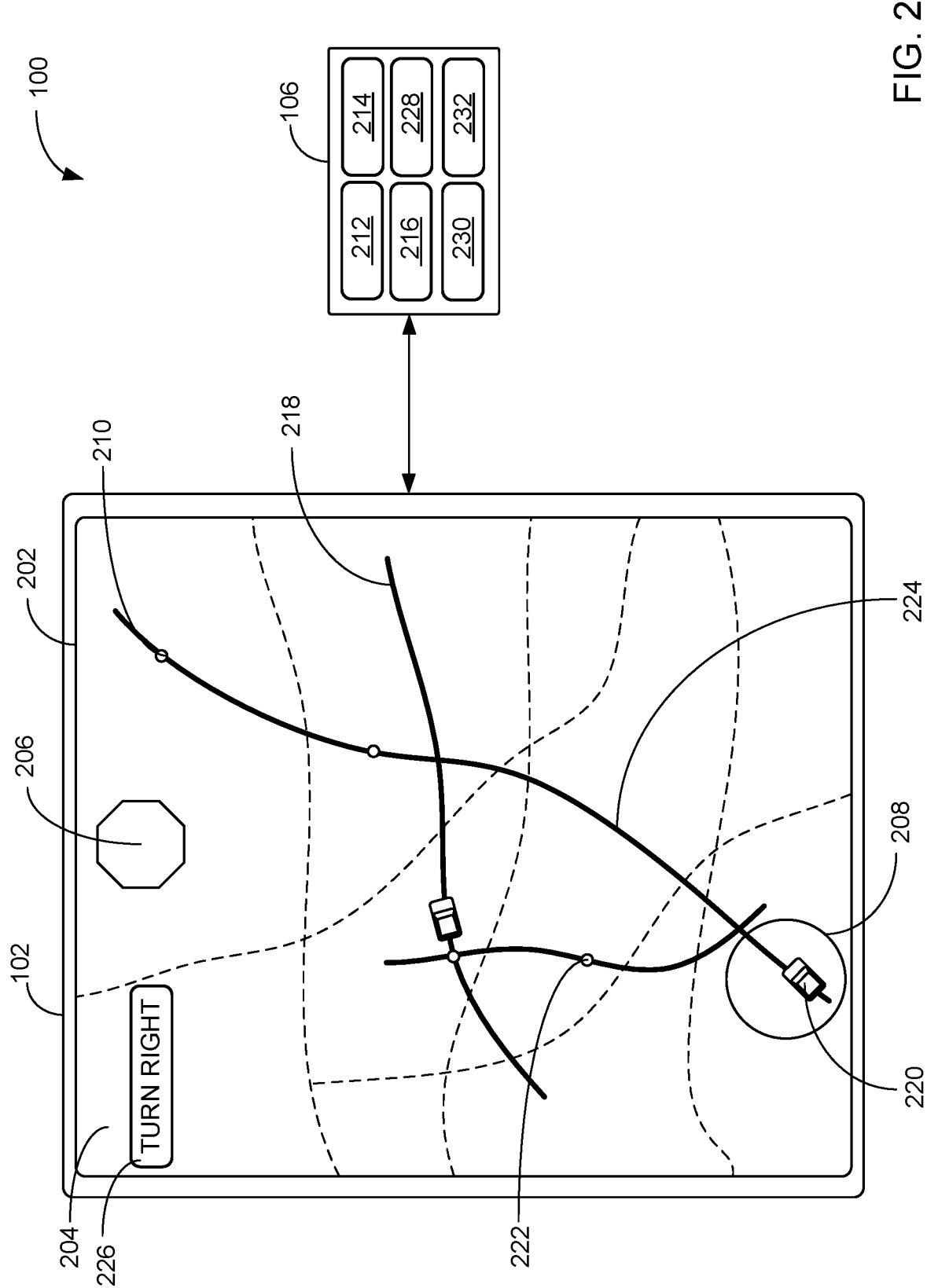
FIG. 2 is an example of a bounding box.

Referring now to FIG. 2, there is shown an example of a bounding box 202 displayed by the navigation system 100. For clarity and brevity, the discussion of the embodiment of the present invention will focus on the first device 102 delivering the result generated by the navigation system 100.

However, the second device 106 and the first device 102 can be discussed interchangeably. The first device 102 and the second device 106 can communicate via the communication path 104.

The bounding box 202 is defined as a physical area including a boundary defined by sets of latitude and longitude coordinates. The bounding box 202 can represent a digital representation of the physical area. For example, the bounding box 202 can include two sets of latitude and longitude establishing the boundary or extents of the physical area. The bounding box 202 can include a geographic region 204. The geographic region 204 is defined as multiple instances of the physical area. For example, the geographic region 204 can include multiple countries. More specifically as an example, the geographic region 204 representing North America can include countries such as Canada and United States.

The bounding box 202 can include a geographic space 206. The geographic space 206 is defined as an arbitrary polygon surface. For example, the boundary of the geographic space 206 can be represented by a series of latitude and longitude. The bounding box 202 can include a home area 208. The home area 208 is defined as the physical area including the user's home. For example, the home area 208 can include a geographic location 210 designated as the user's home. The geographic location 210 is defined as a physical location within the physical area.

For further example, the home area 208 can be determined based on an activity history 212. The activity history 212 is defined as a record of the user's activity. For example, the activity history 212 can include a travel frequency 214. The travel frequency 214 is defined as a number of travels. For example, if the travel frequency 214 to the geographic location 210 meets or exceeds a frequency threshold 216, the geographic space 206 including the geographic location 210 can be designated as the home area 208. The frequency threshold 216 is defined as a limit for a number of travels. For example, the frequency threshold 216 can represent a minimum or maximum number of travels.

The bounding box 202 can include a navigation feature 218. The navigation feature 218 is defined as a component of the physical area. For example, the navigation feature 218 can include an edge representing a component of a road network, a traffic controller, a boundary of the physical area, or a combination thereof.

A current location 220 is defined as a physical location where the user with the first device 102 is detected. A target destination 222 is defined as a physical location where the user's travel ends. A travel route 224 is defined as a path from one physical location to another physical location. For example, the travel route 224 can represent a navigation guidance 226 from the current location 220 to the target destination 222. The navigation guidance 226 is defined as information to aid the user's travel.

A navigation session 228 is defined as a period of time where the navigation guidance 226 is provided. For example, the navigation session 228 can be going on when the user is traveling from the current location 220 to the target destination 222. A search session 230 is defined as a period time where search is performed on the navigation system 100. For example, the search session 230 can be going on when the user is searching for a category of interest 232 on the first device 102. The category of interest 232 is defined as a classification of the target destination 222. For example, the category of interest 232 can include the geographic location 210 representing the user's work place. For another example, the category of interest 232 can include restaurant, theme park, or a combination thereof.

Figure 3:
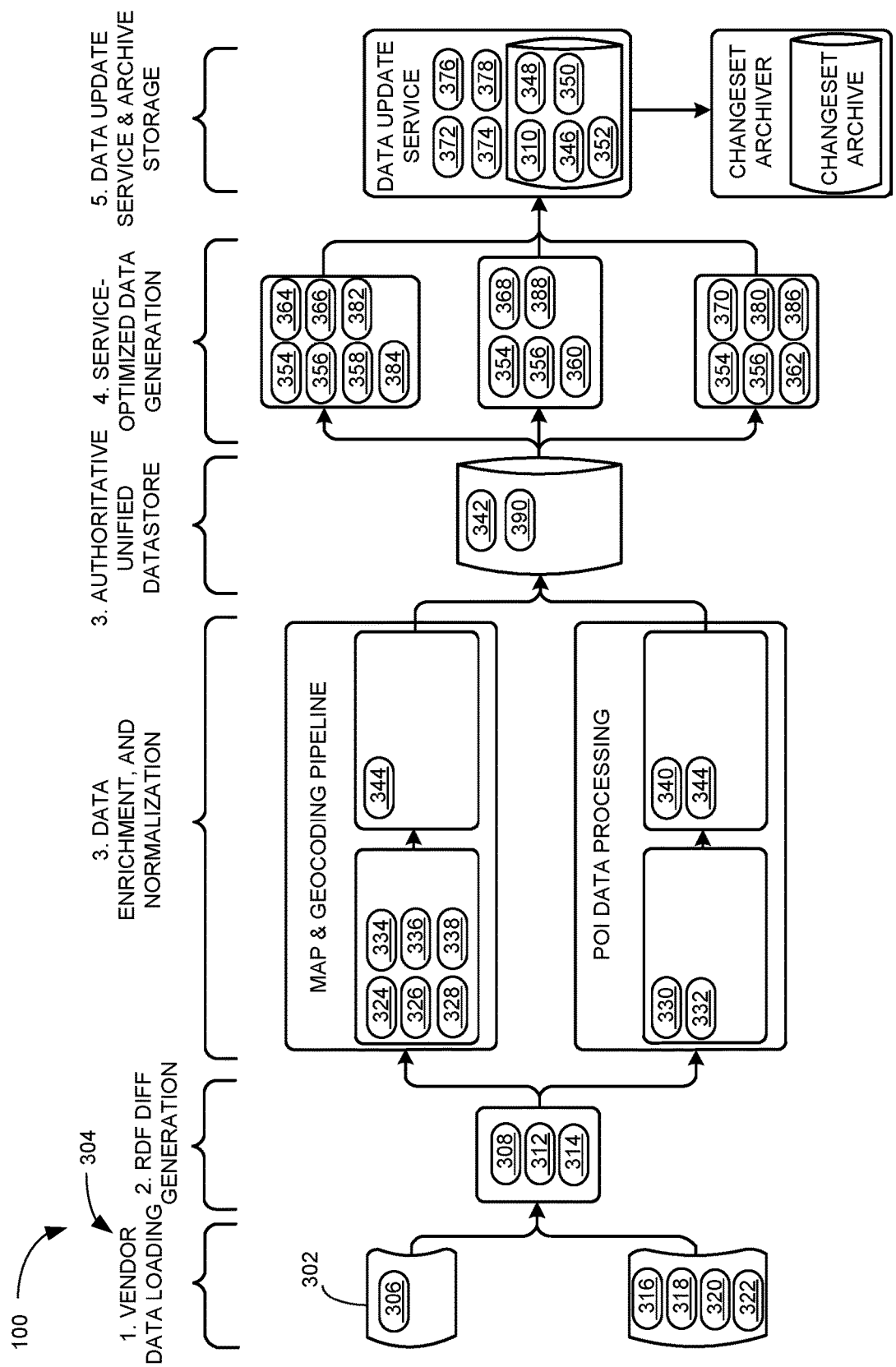
FIG. 3 is a first example of architecture of the navigation system with update mechanism.

Referring now to FIG. 3, there is shown a first example of architecture of the navigation system 100 with update mechanism. The navigation system 100 can receive a navigation external data 302 from a vendor 304. The navigation external data 302 is defined as information received from an external source. For example, the navigation external data 302 can include a vendor data 306, a delta data 308, or a combination thereof. The vendor data 306 is defined as information provided by the vendor 304. The vendor 304 is defined as a provider of the navigation external data 302.

The delta data 308 is defined as a difference between two instances of the information. For example, the delta data 308 can represent the difference between the navigation external data 302 and a navigation local data 310. The navigation local data 310 is defined as information residing within the navigation system 100. For example, the navigation local data 310 can represent the live data utilized by the navigation system 100 to provide the navigation guidance 226 of FIG. 2.

A delta threshold 312 is defined as a limit of the delta data 308. For example, the delta threshold 312 can represent the maximum or minimum value of the delta data 308. A data difference 314 is defined as a result after comparing between two data. For example, the data difference 314 after comparing the navigation external data 302 and the navigation local data 310 can represent the delta data 308.

The navigation external data 302 can include a first data 316, a second data 318, or a combination thereof. The first data 316 or the second data 318 can be different based on a data version 320. The data version 320 is defined as a variant level of information. For example, the first data 316 can have the data version 320 that is older than the second data 318 based on a timestamp 322. The timestamp 322 can represent a variable containing date and time. For a different example, the data version 320 can represent the second data 318 having an updated information to the information contained in the first data 316.

The navigation external data 302 can include various instances of a data type 324. The data type 324 is defined as a categorization of information related to the physical area. The data type 324 can include a map data 326, a geocoding data 328, a point of interest (POI) data 330, an address data 332, a junction view data 334, an advanced driver assistance systems (ADAS) data 336, a landmark data 338, or a combination thereof. The map data 326 can include a diagrammatic representation of the physical area. For example, the map data 326 can include the bounding box 202 of FIG. 2, the geographic region 204 of FIG. 2, the geographic space 206 of FIG. 2, the home area 208 of FIG. 2, or a combination thereof. For further example, the map data 326 can include information related to a road network within the physical area. For further example, the map data 326 can include the navigation feature 218 of FIG. 2.

The geocoding data 328 can include a geographic coordinate of the geographic location 210 of FIG. 2. For example, the geocoding data 328 can represent the latitude and longitude coordinate information of the geographic location 210. The POI data 330 can include specific information about the geographic location 210, the category of interest 232 of FIG. 2, or a combination thereof. For example, the POI data 330 can include the name of the category of interest 232 representing a restaurant.

The address data 332 can include an alphanumeric information to identify and differentiate one instance of the geographic location 210 to another instance of the geographic location 210. The junction view data 334 can include a realistic image of the physical area in combination with the navigation guidance 226 of FIG. 2. For a specific example, the junction view data 334 can represent the navigation guidance 226 including signs on the road network, arrows providing advanced warning, or a combination thereof to aid the user's travel.

The ADAS data 336 can include information related to safeguard the user when operating a vehicle. For example, the ADAS data 336 can include an alert to notify the user of a potential problem, avoid accident, or a combination thereof. For further example, the ADAS data 336 can include an adaptive feature to automate lighting, to provide adaptive cruise control, to automate braking, to provide traffic warning, to provide alert for blind spot, to keep vehicle within a lane, or a combination thereof.

The landmark data 338 can include a conspicuous object, the geographic location 210, or a combination thereof. For example, the landmark data 338 can include the geographic location 210 representing the Statue of Liberty.

The navigation system 100 can deduplicate multiple instances of the navigation external data 302 to generate a deduplicated data 340. More specifically as an example, the multiple instances of the navigation external data 302 can share redundancy, thus, including the same instance of the data type 324 such as the map data 326. The deduplicated data 340 can represent the multiple instances of the navigation external data 302 with the redundancy of the data type 324 being eliminated.

A universal format 342 is defined as a data structure. For example, the universal format 342 can include a schema from OpenStreetMap (OSM)™ compliant database. A normalization data 344 is defined as the navigation external data 302 transformed according to the universal format 342. For example, the navigation external data 302 can be received from the vendor 304 of FIG. 2 different from the data structure of the universal format 342. The navigation external data 302 can be formatted to comply with the universal format 342.

A dimension type 346 can represent a classification of a component of the navigation local data 310. For example, the dimension type 346 can include a layer dimension 348, a spatial dimension 350, a time dimension 352, or a combination thereof. The layer dimension 348 can represent the attribute within the map data 326. For a specific example, the layer dimension 348 can include the road network, traffic, the address data 332, the POI data 330, the landmark data 338, or a combination thereof. The spatial dimension 350 can include the bounding box 202. The navigation system 100 can update each instance of the dimension type 346 of the navigation local data 310. The time dimension 352 can include the time of day, week, month, year, season, or a combination thereof.

An aggregate changeset data 354 is defined as an information to update the navigation local data 310. For example, the aggregate changeset data 354 can include a changeset type 356. The changeset type 356 is defined as a classification of the aggregate changeset data 354. For example, the changeset type 356 can include a map changeset data 358, a geocoding changeset data 360, a POI changeset data 362, or a combination thereof. For further example, the changeset type 356 can include an address changeset data 380, a junction view changeset data 382, an ADAS changeset data 384, a landmark changeset data 386, or a combination thereof.

The map changeset data 358 can represent the map data 326 that has been transformed according to the universal format 342. The geocoding data 328 can represent the geocoding data 328 that has been transformed according to the universal format 342. The POI changeset data 362 can represent the POI data 330 that has been transformed according to the universal format 342.

The address changeset data 380 can represent the address data 332 that has been transformed according to the universal format 342. The junction view changeset data 382 can represent the junction view data 334 that has been transformed according to the universal format 342. The ADAS changeset data 384 can represent the ADAS data 336 334 that has been transformed according to the universal format 342. The landmark changeset data 386 can represent the landmark data 338 that has been transformed according to the universal format 342.

A size type 364 is defined as a classification of data by a data size 390. The data size 390 can represent how large the data is in byte(s). For example, the navigation external data 302, the navigation local data 310, the aggregate changeset data 354, or a combination thereof can be represented in various instances of the size type 364. The size type 364 can include an incremental data 366, a bundle data 368, a complete data 370, or a combination thereof.

The complete data 370 can represent a data having entire set of information for that instance of the data version 320. In contrast, the incremental data 366 can have the data size 390 that is less than or equal to 2% of the data size 390 of the complete data 370. The incremental data 366 can have the size type 364 that is smaller in size than the bundle data 368 or the complete data 370. The complete data 370 can represent the size type 364 that is larger in size than the bundle data 368 or the incremental data 366.

For further example, the data size 390 of the incremental data 366 can be based on the availability of updates for the changeset type 356. For additional example, the navigation system 100 can control the data size 390 of the incremental data 366 based on a size threshold 388. The size threshold 388 is defined as a limit on the data size 390. For example, the size threshold 388 can represent a minimum or maximum instance of the data size 390.

A service type 372 is defined as a classification of a functionality offered by the navigation system 100. For example, the service type 372 can include a map service 374, a geocoding service 376, a POI service 378, or a combination thereof. The map service 374 is defined as a functionality of the navigation system 100 related to the map data 326. For example, the navigation system 100 can execute the map service 374 to present the map data 326. For another example, the map service 374 can retrieve and apply the map changeset data 358 to the navigation local data 310. For a different example, the geocoding service 376 can retrieve and apply the geocoding changeset data 360. For further example, the POI service 378 can retrieve and apply the POI service 378. The data version 320 can be organized according to the service type 372.

Figure 4:
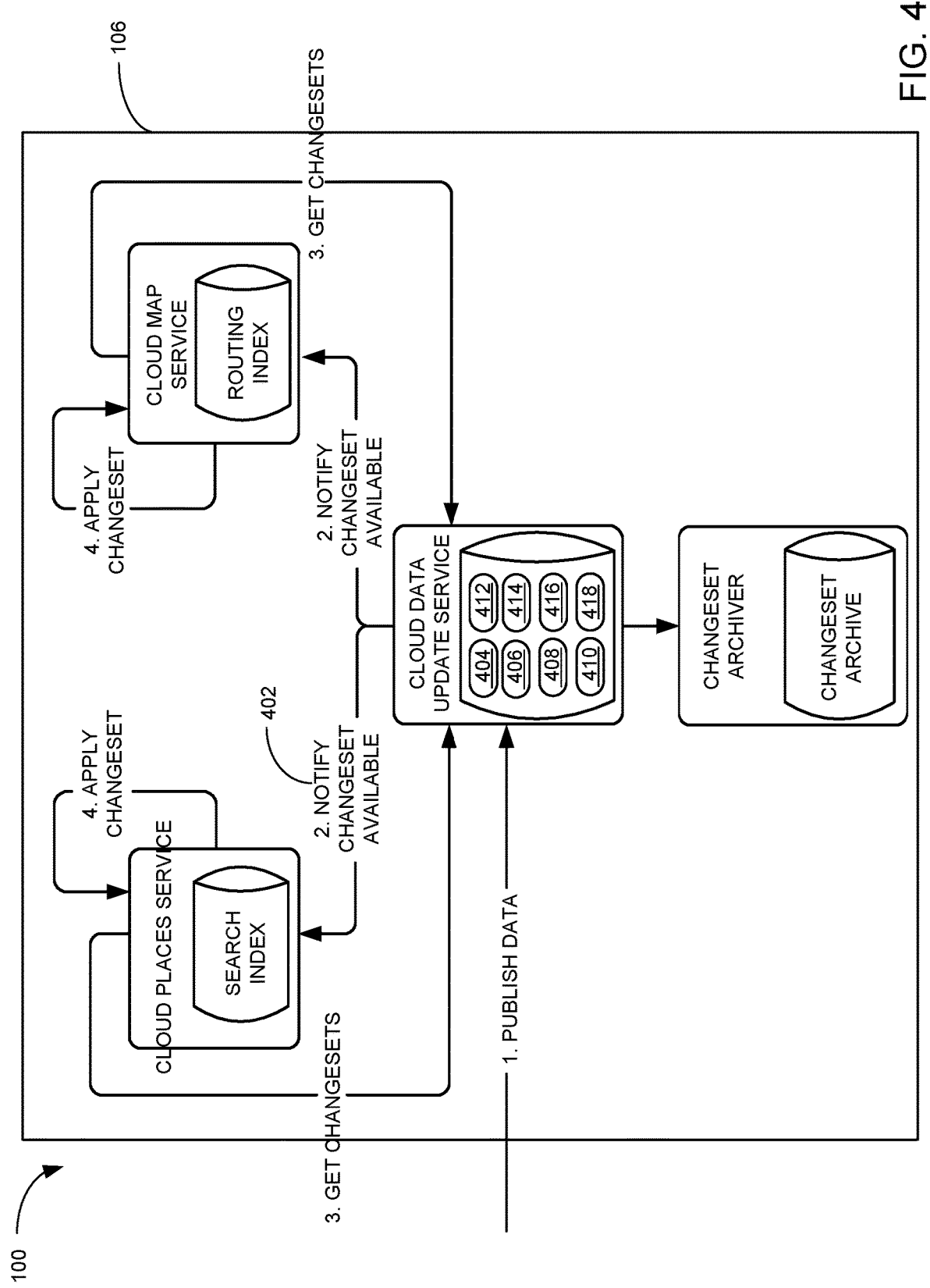
FIG. 4 is a second example of architecture of the navigation system with update mechanism.

Referring now to FIG. 4, there is shown a second example of architecture of the navigation system 100 with update mechanism. More specifically as an example, the second device 106 can implement the second example of the architecture.

An update notification 402 is defined as a notice to inform that a status of an update availability 404. The update availability 404 is defined as an indication of whether the update data is available or not. For example, the navigation system 100 can provide the update notification 402 when the update availability 404 for the aggregate changeset data 354 of FIG. 3, each data instance of the changeset type 356, or a combination thereof is available to update the navigation local data 310 of FIG. 3. For further example, the navigation system 100 can determine the data size 390 of the incremental data 366 of FIG. 3 representing the aggregate changeset data 354, each instance of the changeset type 356, or a combination thereof based on the update availability 404.

A layer prioritization 406 is defined as a priority on delivering the data type 324 of FIG. 3 for updating the navigation local data 310. For example, based on the layer prioritization 406, the navigation system 100 can deliver the map data 326 of FIG. 3 prior to the POI data 330 of FIG. 3 to update the navigation local data 310 with the map data 326.

An allowable bandwidth consumption 408 is defined as a permissible throughput level. For example, based on the allowable bandwidth consumption 408, the navigation system 100 can determine whether the aggregate changeset data 354 can be downloaded for updating the navigation local data 310. A consumption threshold 410 is defined as a limit to the allowable bandwidth consumption 408. For example, the consumption threshold 410 can represent the minimum or maximum throughput required for the allowable bandwidth consumption 408.

A transmission cost 412 is defined as a monetary cost for transmitting the information. For example, the transmission cost 412 for downloading the complete data 370 of FIG. 3 can be higher than downloading the incremental data 366 of FIG. 3. A cost threshold 414 is defined as limit on the transmission cost 412. For example, the transmission cost 412 can represent the minimum or maximum limit for the transmission cost 412.

A transmission speed 416 is defined as a speed for transmitting the information. For example, the transmission speed 416 for downloading the incremental data 366 can be faster than downloading the complete data 370. A speed threshold 418 is defined as limit on the transmission speed 416. For example, the transmission speed 416 can represent the minimum or maximum limit for the transmission speed 416.

The second device 106 can represent the cloud computing resource. The aggregate changeset data 354 can be published to the second device 106 for updating the navigation local data 310. The second device 106 can store the aggregate changeset data 354 to maintain integrity, security, or a combination thereof of the aggregate changeset data 354. The second device 106 can track the data version 320 of the aggregate changeset data 354, the navigation local data 310, or a combination thereof to control the application of the aggregate changeset data 354 to the navigation local data 310.

For further example, the each of the service type 372 can register to receive the update notification 402 according to the update availability 404. For example, if the update availability 404 for dimension type 346 is available, each of the service type 372 can receive the update notification 402 to retrieve and apply the changeset type 356 relevant to each of the service type 372.

Figure 5:
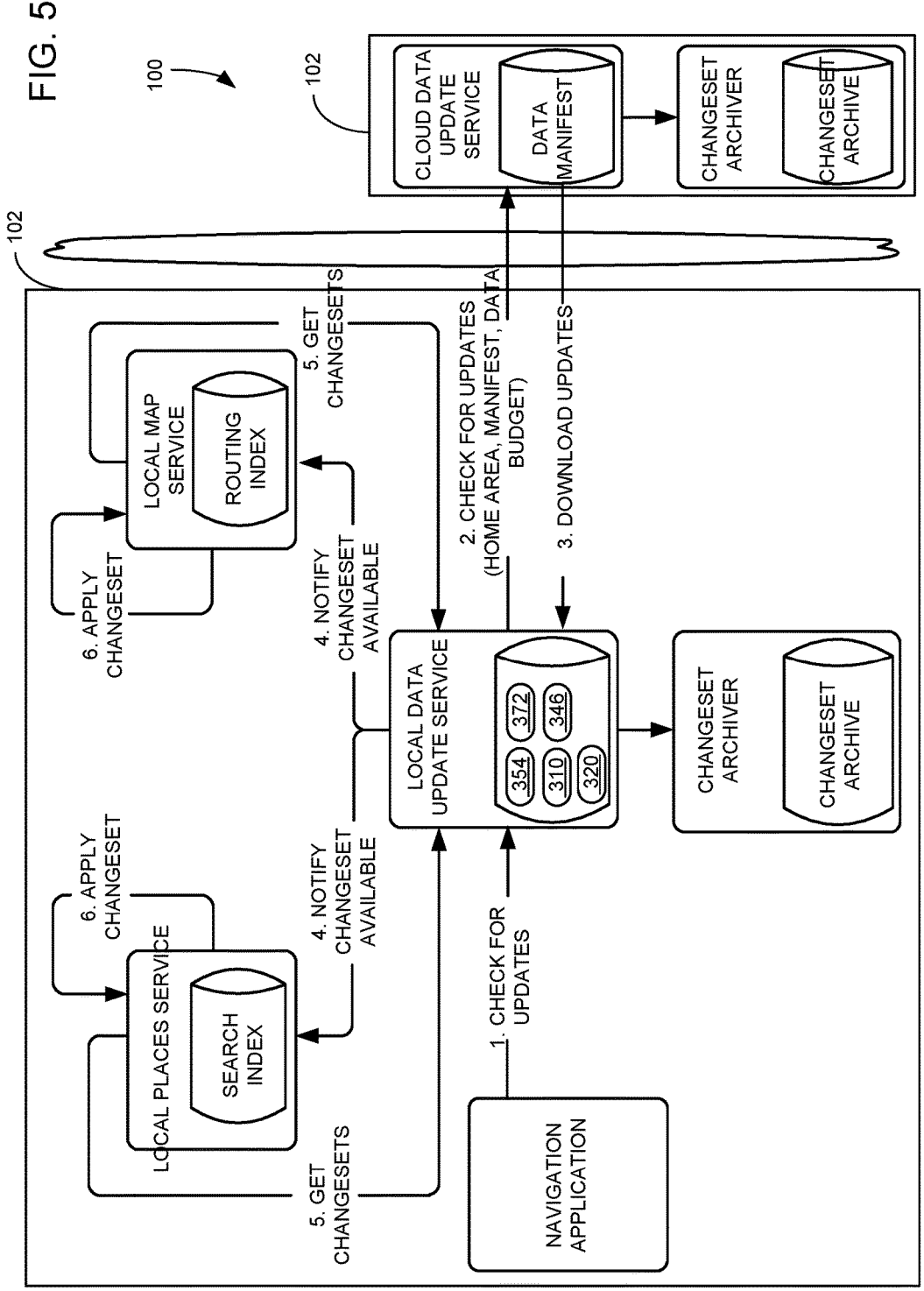
FIG. 5 is a third example of architecture of the navigation system with update mechanism.

Referring now to FIG. 5, there is shown a third example of architecture of the navigation system 100 with update mechanism. More specifically as an example, the first device 102 can implement the second example of the architecture.

The first device 102 can represent the mobile computing device. The navigation system 100 can check for the update availability 404 of FIG. 4 for the bounding box 202 of FIG. 2 locally within the first device 102. The first device 102 can check with the second device 106 of FIG. 1 for the update availability 404.

If the update availability 404 is yes, the first device 102 can retrieve the aggregate changeset data 354 of FIG. 3 from the second device 106. More specifically as an example, the first device 102 can download the aggregate changeset data 354 based on the allowable bandwidth consumption 408 of FIG. 4 compared to the consumption threshold 410 of FIG. 4. The first device 102 can store the aggregate changeset data 354 to maintain integrity, security, or a combination thereof of the aggregate changeset data 354. The first device 102 can track the data version 320 of FIG. 3 of the aggregate changeset data 354, the navigation local data 310, or a combination thereof to control the application of the aggregate changeset data 354 to the navigation local data 310.

For further example, the each of the service type 372 of FIG. 3 can register to receive the update notification 402 of FIG. 4 according to the update availability 404. For example, if the update availability 404 for dimension type 346 of FIG. 3 is available, the each of the service type 372 can receive the update notification 402 to retrieve and apply the changeset type 356 of FIG. 3 relevant to each of the service type 372.

Figure 6:
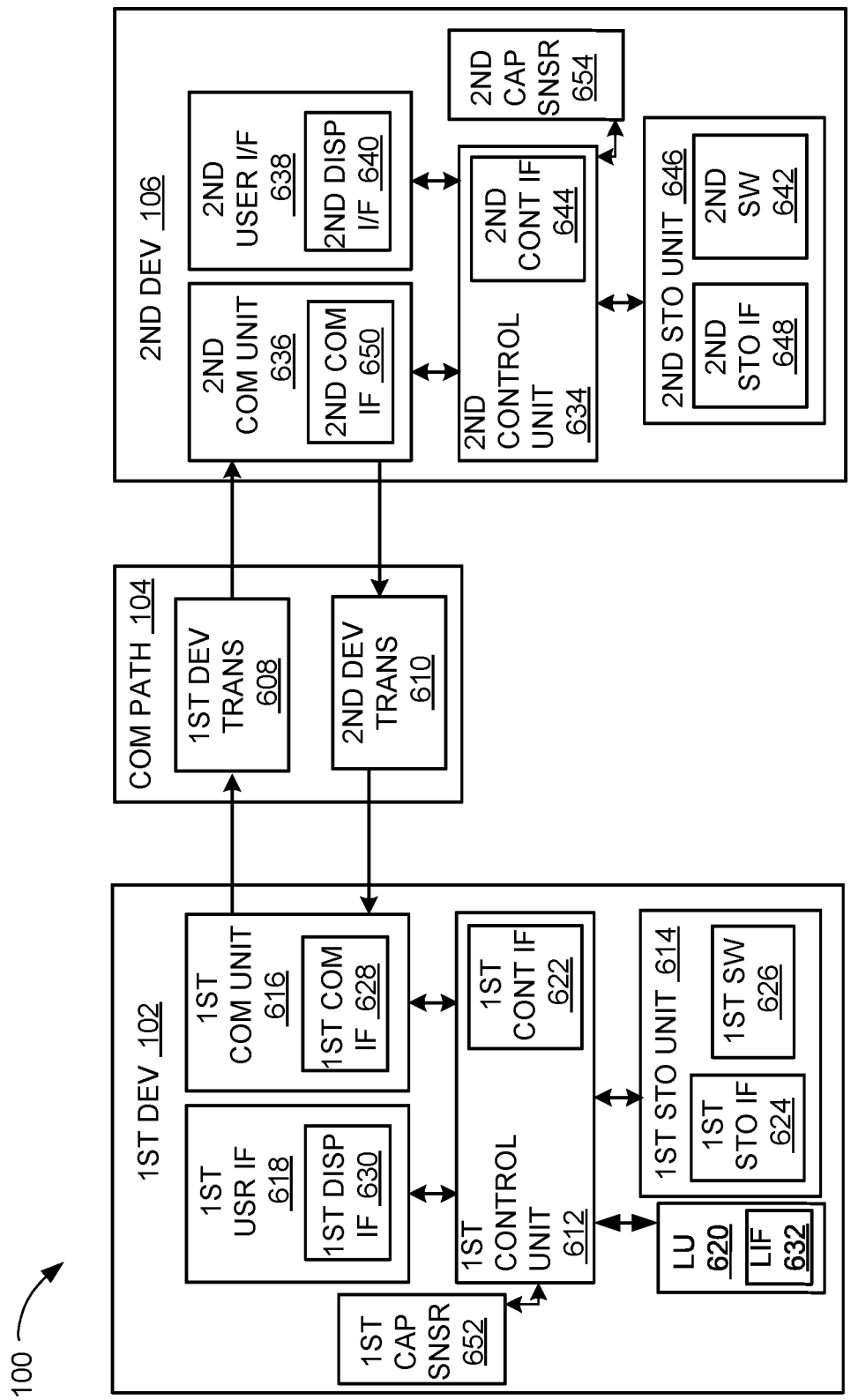
FIG. 6 is an exemplary block diagram of the navigation system.

Referring now to FIG. 6, therein is shown an exemplary block diagram of the navigation system 100. The navigation system 100 can include the first device 102, the communication path 104, and the second device 106. The first device 102 can send information in a first device transmission 608 over the communication path 104 to the second device 106. The second device 106 can send information in a second device transmission 610 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 612, a first storage unit 614, a first communication unit 616, a first user interface 618, and a location unit 620. The first control unit 612 can include a first control interface 622. The first control unit 612 can execute a first software 626 to provide the intelligence of the navigation system 100. The first control unit 612 can be implemented in a number of different manners. For example, the first control unit 612 can be a processor, an embedded processor, a microprocessor, a hardware control logic, a hardware finite state machine (FSM), a digital signal processor (DSP), or a combination thereof. The first control interface 622 can be used for communication between the first control unit 612 and other functional units in the first device 102. The first control interface 622 can also be used for communication that is external to the first device 102.

The first control interface 622 can receive information from the other functional units or from external sources, or can transmit information to the other functional units or to external destinations. The external sources and the external destinations refer to sources and destinations physically separate from the first device 102.

The first control interface 622 can be implemented in different ways and can include different implementations depending on which functional units or external units are being interfaced with the first control interface 622. For example, the first control interface 622 can be implemented with a pressure sensor, an inertial sensor, a microelectromechanical system (MEMS), optical circuitry, waveguides, wireless circuitry, wireline circuitry, or a combination thereof.

The location unit 620 can generate location information, current heading, and current speed of the first device 102, as examples. The location unit 620 can be implemented in many ways. For example, the location unit 620 can function as at least a part of a global positioning system (GPS), an inertial navigation system, a cellular-tower location system, a pressure location system, or any combination thereof.

The location unit 620 can include a location interface 632. The location interface 632 can be used for communication between the location unit 620 and other functional units in the first device 102. The location interface 632 can also be used for communication that is external to the first device 102.

The location interface 632 can receive information from the other functional units or from external sources, or can transmit information to the other functional units or to external destinations. The external sources and the external destinations refer to sources and destinations physically separate from the first device 102.

The location interface 632 can include different implementations depending on which functional units or external units are being interfaced with the location unit 620. The location interface 632 can be implemented with technologies and techniques similar to the implementation of the first control interface 622.

The first storage unit 614 can store the first software 626. The first storage unit 614 can also store the relevant information, such as advertisements, points of interest (POI), navigation routing entries, or any combination thereof.

The first storage unit 614 can be a volatile memory, a nonvolatile memory, an internal memory, an external memory, or a combination thereof. For example, the first storage unit 614 can be a nonvolatile storage such as non-volatile random access memory (NVRAM), Flash memory, disk storage, or a volatile storage such as static random access memory (SRAM).

The first storage unit 614 can include a first storage interface 624. The first storage interface 624 can be used for communication between the location unit 620 and other functional units in the first device 102. The first storage interface 624 can also be used for communication that is external to the first device 102.

The first storage interface 624 can receive information from the other functional units or from external sources, or can transmit information to the other functional units or to external destinations. The external sources and the external destinations refer to sources and destinations physically separate from the first device 102.

The first storage interface 624 can include different implementations depending on which functional units or external units are being interfaced with the first storage unit 614. The first storage interface 624 can be implemented with technologies and techniques similar to the implementation of the first control interface 622.

The first communication unit 616 can enable external communication to and from the first device 102. For example, the first communication unit 616 can permit the first device 102 to communicate with the second device 106, an attachment, such as a peripheral device or a computer desktop, and the communication path 104.

The first communication unit 616 can also function as a communication hub allowing the first device 102 to function as part of the communication path 104 and not limited to be an end point or terminal unit to the communication path 104. The first communication unit 616 can include active and passive components, such as microelectronics or an antenna, for interaction with the communication path 104.

The first communication unit 616 can include a first communication interface 628. The first communication interface 628 can be used for communication between the first communication unit 616 and other functional units in the first device 102. The first communication interface 628 can receive information from the other functional units or can transmit information to the other functional units.

The first communication interface 628 can include different implementations depending on which functional units are being interfaced with the first communication unit 616. The first communication interface 628 can be implemented with technologies and techniques similar to the implementation of the first control interface 622.

The first user interface 618 allows a user (not shown) to interface and interact with the first device 102. The first user interface 618 can include an input device and an output device. Examples of the input device of the first user interface 618 can include a keypad, a touchpad, soft-keys, a keyboard, a microphone, a camera, or any combination thereof to provide data and communication inputs.

The first user interface 618 can include a first display interface 630. The first display interface 630 can include a display, a projector, a video screen, a speaker, a headset, or any combination thereof.

The first control unit 612 can operate the first user interface 618 to display information generated by the navigation system 100. The first control unit 612 can also execute the first software 626 for the other functions of the navigation system 100, including receiving location information from the location unit 620. The first control unit 612 can further execute the first software 626 for interaction with the communication path 104 via the first communication unit 616.

The second device 106 can be optimized for implementing the present invention in a multiple device embodiment with the first device 102. The second device 106 can provide the additional or higher performance processing power compared to the first device 102. The second device 106 can include a second control unit 634, a second communication unit 636, and a second user interface 638.

The second user interface 638 allows a user (not shown) to interface and interact with the second device 106. The second user interface 638 can include an input device and an output device. Examples of the input device of the second user interface 638 can include a keypad, a touchpad, soft-keys, a keyboard, a microphone, a camera, or any combination thereof to provide data and communication inputs. Examples of the output device of the second user interface 638 can include a second display interface 640. The second display interface 640 can include a display, a projector, a video screen, a speaker, a headset, or any combination thereof.

The second control unit 634 can execute a second software 642 to provide the intelligence of the second device 106 of the navigation system 100. The second software 642 can operate in conjunction with the first software 626. The second control unit 634 can provide additional performance compared to the first control unit 612.

The second control unit 634 can operate the second user interface 638 to display information. The second control unit 634 can also execute the second software 642 for the other functions of the navigation system 100, including operating the second communication unit 636 to communicate with the first device 102 over the communication path 104.

The second control unit 634 can be implemented in a number of different manners. For example, the second control unit 634 can be a processor, an embedded processor, a microprocessor, a hardware control logic, a hardware finite state machine (FSM), a digital signal processor (DSP), or a combination thereof.

The second control unit 634 can include a second control interface 644. The second control interface 644 can be used for communication between the second control unit 634 and other functional units in the second device 106. The second control interface 644 can also be used for communication that is external to the second device 106.

The second control interface 644 can receive information from the other functional units or from external sources, or can transmit information to the other functional units or to external destinations. The external sources and the external destinations refer to sources and destinations physically separate from the second device 106.

The second control interface 644 can be implemented in different ways and can include different implementations depending on which functional units or external units are being interfaced with the second control interface 644. For example, the second control interface 644 can be implemented with a pressure sensor, an inertial sensor, a microelectromechanical system (MEMS), optical circuitry, waveguides, wireless circuitry, wireline circuitry, or a combination thereof.

A second storage unit 646 can store the second software 642. The second storage unit 646 can also store the relevant information, such as advertisements, points of interest (POI), navigation routing entries, or any combination thereof. The second storage unit 646 can be sized to provide the additional storage capacity to supplement the first storage unit 614.

For illustrative purposes, the second storage unit 646 is shown as a single element, although it is understood that the second storage unit 646 can be a distribution of storage elements. Also for illustrative purposes, the navigation system 100 is shown with the second storage unit 646 as a single hierarchy storage system, although it is understood that the navigation system 100 can have the second storage unit 646 in a different configuration. For example, the second storage unit 646 can be formed with different storage technologies forming a memory hierarchal system including different levels of caching, main memory, rotating media, or off-line storage.

The second storage unit 646 can be a volatile memory, a nonvolatile memory, an internal memory, an external memory, or a combination thereof. For example, the second storage unit 646 can be a nonvolatile storage such as non-volatile random access memory (NVRAM), Flash memory, disk storage, or a volatile storage such as static random access memory (SRAM).

The second storage unit 646 can include a second storage interface 648. The second storage interface 648 can be used for communication between the location unit 620 and other functional units in the second device 106. The second storage interface 648 can also be used for communication that is external to the second device 106.

The second storage interface 648 can receive information from the other functional units or from external sources, or can transmit information to the other functional units or to external destinations. The external sources and the external destinations refer to sources and destinations physically separate from the second device 106.

The second storage interface 648 can include different implementations depending on which functional units or external units are being interfaced with the second storage unit 646. The second storage interface 648 can be implemented with technologies and techniques similar to the implementation of the second control interface 644.

The second communication unit 636 can enable external communication to and from the second device 106. For example, the second communication unit 636 can permit the second device 106 to communicate with the first device 102 over the communication path 104.

The second communication unit 636 can also function as a communication hub allowing the second device 106 to function as part of the communication path 104 and not limited to be an end point or terminal unit to the communication path 104. The second communication unit 636 can include active and passive components, such as microelectronics or an antenna, for interaction with the communication path 104.

The second communication unit 636 can include a second communication interface 650. The second communication interface 650 can be used for communication between the second communication unit 636 and other functional units in the second device 106. The second communication interface 650 can receive information from the other functional units or can transmit information to the other functional units.

The second communication interface 650 can include different implementations depending on which functional units are being interfaced with the second communication unit 636. The second communication interface 650 can be implemented with technologies and techniques similar to the implementation of the second control interface 644.

The first communication unit 616 can couple with the communication path 104 to send information to the second device 106 in the first device transmission 608. The second device 106 can receive information in the second communication unit 636 from the first device transmission 608 of the communication path 104.

The second communication unit 636 can couple with the communication path 104 to send information to the first device 102 in the second device transmission 610. The first device 102 can receive information in the first communication unit 616 from the second device transmission 610 of the communication path 104. The navigation system 100 can be executed by the first control unit 612, the second control unit 634, or a combination thereof.

For illustrative purposes, the second device 106 is shown with the partition having the second user interface 638, the second storage unit 646, the second control unit 634, and the second communication unit 636, although it is understood that the second device 106 can have a different partition. For example, the second software 642 can be partitioned differently such that some or all of its function can be in the second control unit 634 and the second communication unit 636. Also, the second device 106 can include other functional units not shown in FIG. 6 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 620, although it is understood that the second device 106 can also operate the location unit 620.

A first capturing device 652 can represent the capturing device 210 of FIG. 2. Examples of the first capturing device 652 can include a digital camera, video camera, thermal camera, night vision camera, infrared camera, x-ray camera, or the combination thereof. Examples of the first capturing device 652 can further include accelerometer, thermometer, microphone, wireless signal receiver, remote physiological monitoring device, light identifier, magnetic sensor, or the combination thereof.

A second capturing device 654 can represent the capturing device 210. Examples of the second capturing device 654 can include a digital camera, video camera, thermal camera, night vision camera, infrared camera, x-ray camera, or the combination thereof. Examples of the second capturing device 654 can further include accelerometer, thermometer, microphone, wireless signal receiver, remote physiological monitoring device, light identifier, magnetic sensor, or the combination thereof.

Figure 7:
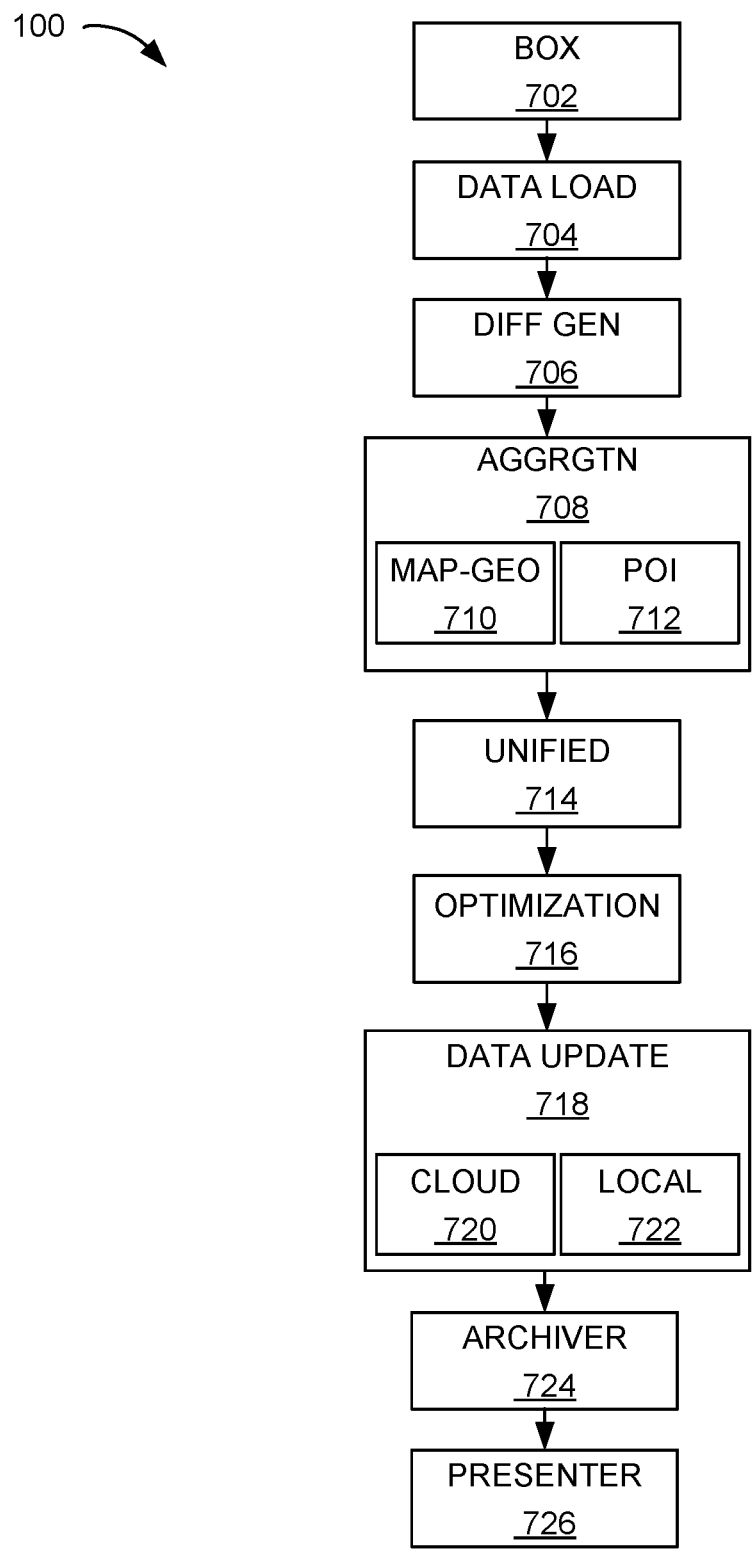
FIG. 7 is a control flow of the navigation system.

Referring now to FIG. 7, therein is shown a control flow of the navigation system 100. The navigation system 100 can include a box module 702. The box module 702 calculates the bounding box 202 of FIG. 2. For example, the box module 702 can calculate the bounding box 202 including the geographic region 204 of FIG. 2.

The box module 702 can calculate the bounding box 202 in a number of ways. For example, the box module 702 can calculate the bounding box 202 based on two sets of latitude and longitude coordinates to define the extents of the physical area. For a different example, the box module 702 can calculate the bounding box 202 representing the geographic region 204 predefined by boundaries of the country, the state, the city, the neighborhood, or a combination thereof. More specifically as an example, the geographic region 204 can include multiple instances of the country, the state, the city, the neighborhood, or a combination thereof.

For another example, the box module 702 can calculate the bounding box 202 representing the geographic space 206 of FIG. 2. For a specific example, the box module 702 can calculate the geographic space 206 based on series of latitudes and longitudes to form a shape of polygon surface. For a different example, the box module 702 can determine the geographic space 206 based on country boundary, state boundary, city boundary, zip code, area code, or a combination thereof.

For a different example, the box module 702 can determine the bounding box 202 representing the home area 208 of FIG. 2. More specifically as an example, the box module 702 can determine the home area 208 based on the activity history 212 of FIG. 2. The activity history 212 can include the travel frequency 214 of FIG. 2 of the user of the first device 102 to a specific instance of the geographic location 210 of FIG. 2. The box module 702 can determine the home area 208 based on the travel frequency 214 to the geographic location 210 meets or exceeds the frequency threshold 216 of FIG. 2. For further example, the box module 702 can determine the home area 208 based on the bounding box 202 surrounding the geographic location 210 specified as the user's home, manual entry by the user of the first device 102, or a combination thereof. The box module 702 can transmit the bounding box 202 to a data load module 704.

The navigation system 100 can include the data load module 704, which can be coupled to the box module 702. The data load module 704 receives the navigation external data 302 of FIG. 3. For example, the data load module 704 can receive the navigation external data 302 including the vendor data 306 of FIG. 3, the delta data 308 of FIG. 3, or a combination thereof from the vendor 304 of FIG. 3.

For further example, the navigation external data 302 can include the size type 364 of FIG. 3, the data type 324 of FIG. 3, or a combination thereof. For example, the data load module 704 can receive the navigation external data 302 having the size type 364 of the incremental data 366 of FIG. 3, the bundle data 368 of FIG. 3, the complete data 370 of FIG. 3, or a combination thereof. For another example, the data load module 704 can receive the navigation external data 302 including the data type 324 representing the map data 326 of FIG. 3, the geocoding data 328 of FIG. 3, the POI data 330 of FIG. 3, the address data 332 of FIG. 3, the junction view data 334 of FIG. 3, the ADAS data 336 of FIG. 3, the landmark data 338 of FIG. 3, or a combination thereof. The data load module 704 can transmit the navigation external data 302 to a diff generation module 706.

The navigation system 100 can include the diff generation module 706, which can be coupled to the data load module 704. The diff generation module 706 computes the data difference 314 of FIG. 3. For example, the diff generation module 706 can compute the data difference 314 between each instance of the multiple instances of the navigation external data 302 received.

More specifically as an example, the diff generation module 706 can compute the data difference 314 between multiple instances of the navigation external data 302 from different time periods. For example, the diff generation module 706 can compute the data difference 314 between the first data 316 of FIG. 3 of the navigation external data 302 and the second data 318 of FIG. 3 of the navigation external data 302 where the first data 316 can be received earlier than the second data 318.

For another example, the diff generation module 706 can compute the data difference 314 between the navigation external data 302 and the navigation local data 310 of FIG. 3. More specifically as an example, the diff generation module 706 can compute the data difference 314 by identifying the delta data 308 between the navigation external data 302 and the navigation local data 310.

For further example, the diff generation module 706 can determine whether the data difference 314 between the navigation external data 302 and the navigation local data 310 meets or exceeds the delta threshold 312 of FIG. 3. More specifically as an example, the delta threshold 312 can be set at 20% of the navigation local data 310. The diff generation module 706 can check whether the delta data 308 is less than the delta threshold 312. The diff generation module 706 can transmit the data difference 314 to an aggregation module 708.

The navigation system 100 can include the aggregation module 708, which can be coupled to the diff generation module 706. The aggregation module 708 generates the normalization data 344 of FIG. 3. For example, the aggregation module 708 can generate the normalization data 344 based on the deduplicated data 340 of FIG. 3.

The aggregation module 708 can generate the normalization data 344 in a number of ways. The aggregation module 708 can include a map-geo pipeline module 710, a POI pipeline module 712, or a combination thereof. For example, the map-geo pipeline module 710, the POI pipeline module 712, or a combination thereof can each generate the normalization data 344.

The map-geo pipeline module 710, the POI pipeline module 712, or a combination thereof can generate the normalization data 344 in a number of ways. For example, the map-geo pipeline module 710 can generate the normalization data 344 for the map data 326, the geocoding data 328, or a combination thereof based on the navigation external data 302. More specifically as an example, the map-geo pipeline module 710 can generate the normalization data 344 by transforming the navigation external data 302 into the universal format 342 of FIG. 3. The universal format 342 can represent a schema from an extended OSM compliant database including data from all domains including the map data 326, the geocoding data 328, the POI data 330, the address data 332, the junction view data 334, the ADAS data 336, the landmark data 338, or a combination thereof.

For further example, the map-geo pipeline module 710 can generate the normalization data 344 by deriving the data such as "postal code center" possibly unavailable in the navigation external data 302 from the vendor 304 from the OSM database to format the navigation external data 302 into the universal format 342. For additional example, the map-geo pipeline module 710 can build "administration hierarchy" or "side-files." The administration hierarchy can represent the geographic region 204 defined by the government such as city, county, state, country, or a combination thereof. The side-files can represent the recording of the administration hierarchy as additional index file.

The map-geo pipeline module 710 can generate the normalization data 344 based on the universal format 342 to adhere the navigation external data 302 to the universal format 342 for the navigation system 100. For further example, the by generating the normalization data 344 based on the universal format 342, the map-geo pipeline module 710 can generate persistent ID to identify the same instance of the map data 326, the geocoding data 328, the POI data 330, the address data 332, the junction view data 334, the ADAS data 336, the landmark data 338, or a combination thereof to optimize the delta data 308 that needs to be transferred for updating. The map-geo pipeline module 710 can transmit the normalization data 344 for the map data 326, the geocoding data 328, or a combination thereof to a unified module 714.

For a different example, the POI pipeline module 712 can generate the normalization data 344 for the POI data 330. The POI pipeline module 712 can generate the normalization data 344 in a number of ways. For example, the POI pipeline module 712 can generate the deduplicated data 340 of FIG. 3 based on eliminating a redundant instance of the navigation external data 302. Multiple instances of the navigation external data 302 can be redundant as the navigation system 100 receives the navigation external data 302 from multiple instances of the vendor 304. By generating the deduplicated data 340, the POI pipeline module 712 can eliminate the redundant instance of the POI data 330.

For further example, the POI pipeline module 712 can generate the normalization data 344 based on the deduplicated data 340, the universal format 342, or a combination thereof. More specifically as an example, the POI pipeline module 712 can generate the normalization data 344 by including the POI data 330 without the redundancy, transforming the POI data 330 according to the universal format 342, or a combination thereof.

For additional example, the POI pipeline module 712 can generate the normalization data 344 based on mapping the POI data 330 according to OSM schema as a node or a way, which may be a polygon if the POI data 330 is closed or a multipolygon. As a result the normalization data 344 can include tags to describe the feature that the normalization data 344 represents. The persistent ID can be used to identify the data version 320 of FIG. 3 and the tags can be compared to identify the differences between multiple instances of the normalization data 344. The POI pipeline module 712 can transmit the normalization data 344 for the POI data 330 to the unified module 714.

The navigation system 100 can include the unified module 714, which can be coupled to the aggregation module 708. The unified module 714 stores the normalization data 344. For example, the unified module 714 can store the normalization data 344 under the universal format 342 the first storage unit 614 of FIG. 6, the second storage unit 646 of FIG. 6, or a combination thereof.

For additional example, the unified module 714 can control the data version 320 of the normalization data 344. More specifically as an example, the unified module 714 can control the data version 320 by comparing the difference between one instance of the normalization data 344 and another instance of the normalization data 344 representing the same item. The unified module 714 can transmit the normalization data 344 to an optimization module 716.

The navigation system 100 can include the optimization module 716, which can be coupled to the unified module 714. The optimization module 716 generates the aggregate changeset data 354 of FIG. 3. The aggregate changeset data 354 can represent the navigation external data 302, the delta data 308, or a combination thereof transformed under the universal format 342 to update the navigation local data 310. For example, the optimization module 716 can generate the aggregate changeset data 354 based on the normalization data 344.

The optimization module 716 can generate the aggregate changeset data 354 in a number of ways. For example, the optimization module 716 can generate the aggregate changeset data 354 based on the dimension type 346 of FIG. 3, the size type 364, the changeset type 356 of FIG. 3, or a combination thereof.

For a specific example, the optimization module 716 can generate the aggregate changeset data 354 based on splitting the navigation external data 302 according to the dimension type 346. The optimization module 716 can generate the aggregate changeset data 354 by splitting each content of the normalization data 344 into, for example, the layer dimension 348 of FIG. 3, the spatial dimension 350 of FIG. 3, the time dimension 352 of FIG. 3, or a combination thereof.

For further example, the optimization module 716 can generate the aggregate changeset data 354 by splitting the each content of the normalization data 344 represented by the changeset type 356. The changeset type 356 can include the map changeset data 358 of FIG. 3, the geocoding changeset data 360 of FIG. 3, the POI changeset data 362 of FIG. 3, the address changeset data 380 of FIG. 3, the junction view changeset data 382 of FIG. 3, the ADAS changeset data 384 of FIG. 3, the landmark changeset data 386 of FIG. 3, or a combination thereof. As discussed above, the optimization module 716 can generate the aggregate changeset data 354 by splitting the map changeset data 358, the geocoding changeset data 360, the POI changeset data 362, the address changeset data 380, the junction view changeset data 382, the ADAS changeset data 384, the landmark changeset data 386, or a combination thereof into the layer dimension 348, the spatial dimension 350, the time dimension 352, or a combination thereof.

For a different example, the optimization module 716 can generate the aggregate changeset data 354 based on the size type 364. The size type 364 can include the incremental data 366, the bundle data 368, the complete data 370, or a combination thereof.

For example, the optimization module 716 can generate the aggregate changeset data 354 based on the size type 364 for each of the changeset type 356. More specifically as an example, the optimization module 716 can generate the map changeset data 358, the geocoding changeset data 360, the POI changeset data 362, the address changeset data 380, the junction view changeset data 382, the ADAS changeset data 384, the landmark changeset data 386, or a combination thereof as the incremental data 366, the bundle data 368, the complete data 370, or a combination thereof. The map changeset data 358 can include the size type 364 of the incremental data 366, the bundle data 368, the complete data 370, or a combination thereof. The geocoding changeset data 360 can include the size type 364 of the incremental data 366, the bundle data 368, the complete data 370, or a combination thereof. The POI changeset data 362 can include the size type 364 of the incremental data 366, the bundle data 368, the complete data 370, or a combination thereof.

The address changeset data 380 can include the size type 364 of the incremental data 366, the bundle data 368, the complete data 370, or a combination thereof. The junction view changeset data 382 can include the size type 364 of the incremental data 366, the bundle data 368, the complete data 370, or a combination thereof. The ADAS changeset data 384 can include the size type 364 of the incremental data 366, the bundle data 368, the complete data 370, or a combination thereof. The landmark changeset data 386 can include the size type 364 of the incremental data 366, the bundle data 368, the complete data 370, or a combination thereof.

For further example, the optimization module 716 can determine the size type 364 based on the data size 390 of FIG. 3 of the changeset type 356, the aggregate changeset data 354, or a combination thereof meeting or exceeding the size threshold 388. More specifically as an example, the size threshold 388 can be divided into two tiers. If the data size 390 is less than the lower instance of the size threshold 388, the optimization module 716 can determine the size type 364 to represent the incremental data 366. If the data size 390 is greater than the higher instance of the size threshold 388, the optimization module 716 can determine the size type 364 to represent the complete data 370. If the data size 390 is greater than the lower instance of the size threshold 388 but less than the higher instance of the size threshold 388, the optimization module 716 can determine the size type 364 to represent the bundle data 368.

For additional example, the optimization module 716 can determine the size type 364 based on change in the data format of the vendor data 306. More specifically as an example, based on the change in the data format of the vendor data 306, the navigation system 100 can no longer update the navigation local data 310 with the vendor data 306 because of the incompatibility between the vendor data 306 and the navigation local data 310. As a result, the optimization module 716 can determine the size type 364 to represent the complete data 370 for updating the navigation local data 310 completely.

For further example, the optimization module 716 can generate the aggregate changeset data 354 based on the data difference 314 meeting or exceeding the delta threshold 312. More specifically as an example, if the data difference 314 meets or exceeds the delta threshold 312, the optimization module 716 can generate the aggregate changeset data 354. If the data difference 314 is below the delta threshold 312, the optimization module 716 can generate the individual instance of the changeset type 356 as an update data. The optimization module 716 can transmit the aggregate changeset data 354 to publish the aggregate changeset data 354 to a data update service module 718.

The navigation system 100 can include the data update service module 718, which can be coupled to the optimization module 716. The data update service module 718 updates the navigation local data 310. For example, the data update service module 718 can update the navigation local data 310 based on applying the aggregate changeset data 354.

The data update service module 718 can update the navigation local data 310 in a number of ways. The data update service module 718 can include a cloud service module 720, a local service module 722, or a combination thereof. The cloud service module 720 and the local service module 722 can function independently from one another. For example, the cloud service module 720 can update the navigation local data 310 prior to the local service module 722 updating the navigation local data 310.

The data update service module 718 can include the cloud service module 720. For example, the cloud service module 720 can track the data version 320 of the aggregate changeset data 354, the service type 372 of FIG. 3 that the aggregate changeset data 354 can apply to, each data instance of the changeset data 356, or a combination thereof.

For a specific example, the cloud service module 720 can track the data version 320 based on the timestamp 322 of FIG. 3 of the aggregate changeset data 354. For a different example, the cloud service module 720 can track the data version 320 based on the dimension type 346, the size type 364, the changeset type 356, or a combination thereof in addition to the timestamp 322.

For a different example, the cloud service module 720 can track the data version 320 based on the service type 372. The service type 372 can include the map service 374 of FIG. 3, the geocoding service 376 of FIG. 3, the POI service 378 of FIG. 3, or a combination thereof. More specifically as an example, the cloud service module 720 can track the data version 320 of the aggregate changeset data 354 by each of the service type 372. For further example, the cloud service module 720 can track the data version 320 of the aggregate changeset data 354 for the service type 372 based on the dimension type 346, the size type 364, the changeset type 356, or a combination thereof.

The cloud service module 720 can publish the update notification 402 of FIG. 4 based on the update availability 404 of FIG. 4, the service type 372, the dimension type 346, the size type 364, the changeset type 356, or a combination thereof. More specifically as an example, each of the service type 372 can be registered to receive the update notification 402 when the update availability 404 indicates that the aggregate changeset data 354 for the changeset type 356 is available. The cloud service module 720 can publish the update notification 402 based on the update availability 404 indicating that the aggregate changeset data 354, each data instance of the changeset type 356, or a combination thereof is available.

For further example, the cloud service module 720 can publish the update notification 402 based on the dimension type 346, the size type 364, the changeset type 356, or a combination thereof. More specifically as an example, each of the service type 372 can be registered to receive the update notification 402 when the update availability 404 indicates that the aggregate changeset data 354 for the dimension type 346 is available. For example, when the aggregate changeset data 354 for the layer dimension 348 is available, the cloud service module 720 can publish the update notification 402 for the layer dimension 348.

For further example, by publishing the update notification 402, each of the service type 372 can retrieve the aggregate changeset data 354 relevant for the given instance of the service type 372. For a specific example, the POI service 378 can retrieve the POI changeset data 362 for the POI data 330. For another example, the geocoding service 376 can retrieve the geocoding changeset data 360 for the geocoding data 328. For a different example, the map service 374 can retrieve the map changeset data 358 for the map data 326.

For further example, the cloud service module 720 can download the aggregate changeset data 354 from the cloud service module 720 based on the allowable bandwidth consumption 408 of FIG. 4. More specifically as an example, if the allowable bandwidth consumption 408 is below the consumption threshold 410 of FIG. 4, the cloud service module 720 can download the aggregate changeset data 354 with the size type 364 of the incremental data 366. For another example, if the allowable bandwidth consumption 408 meets the consumption threshold 410, the cloud service module 720 can download the aggregate changeset data 354 with the size type 364 of the bundle data 368. For different example, if the allowable bandwidth consumption 408 is above the consumption threshold 410, the cloud service module 720 can download the aggregate changeset data 354 with the size type 364 of the complete data 370.

For further example, the cloud service module 720 can download the aggregate changeset data 354 according to the changeset type 356 based on the allowable bandwidth consumption 408 and the consumption threshold 410. As discussed the changeset type 356 can include the map changeset data 358, the geocoding changeset data 360, the POI changeset data 362, the address changeset data 380, the junction view changeset data 382, the ADAS changeset data 384, the landmark changeset data 386, or a combination thereof. If the allowable bandwidth consumption 408 is below the consumption threshold 410, the cloud service module 720 can download the aggregate changeset data 354 with the one type of the changeset type 356. For another example, if the allowable bandwidth consumption 408 meets the consumption threshold 410, the cloud service module 720 can download the aggregate changeset data 354 with more than one type of the changeset type 356. For different example, if the allowable bandwidth consumption 408 is above the consumption threshold 410, the cloud service module 720 can download the aggregate changeset data 354 with all of the changeset type 356.

For additional example, the cloud service module 720 can download the aggregate changeset data 354 based on the transmission cost 412 of FIG. 4, the transmission speed 416 of FIG. 4, or a combination thereof. More specifically as an example, if the transmission cost 412 exceeds the cost threshold 414 of FIG. 4, the cloud service module 720 can download the aggregate changeset data 354 with the size type 364 of the incremental data 366. If the transmission cost 412 meets the cost threshold 414, the cloud service module 720 can download the aggregate changeset data 354 with the size type 364 of the bundle data 368. If the transmission cost 412 is below the cost threshold 414, the cloud service module 720 can download the aggregate changeset data 354 with the size type 364 of the complete data 370.

For further example, if the transmission speed 416 exceeds the speed threshold 418 of FIG. 4, the cloud service module 720 can download the aggregate changeset data 354 with the size type 364 of the complete data 370. If the transmission speed 416 meets the speed threshold 418, the cloud service module 720 can download the aggregate changeset data 354 with the size type 364 of the bundle data 368. If the transmission speed 416 is below the speed threshold 418, the cloud service module 720 can download the aggregate changeset data 354 with the size type 364 of the incremental data 366.

The cloud service module 720 can update the navigation local data 310 based on applying the aggregate changeset data 354 in a number of ways. For example, the cloud service module 720 can update the navigation local data 310 based on the data version 320. More specifically as an example, if the data version 320 of the navigation local data 310 is older than the aggregate changeset data 354, the cloud service module 720 can update the navigation local data 310 with the aggregate changeset data 354.

For a different example, the cloud service module 720 can update the navigation local data 310 based on the update availability 404 for each of the changeset type 356. More specifically as an example, if the changeset type 356 for the map changeset data 358 is available thus the delta data 308 is identified between the navigation external data 302 and the navigation local data 310, the cloud service module 720 can update the navigation local data 310 for the map data 326 without updating the other instance of the data type 324. The cloud service module 720 can update the navigation local data 310 for the POI data 330, the geocoding data 328, the address data 332, the junction view data 334, the ADAS data 336, the landmark data 338, or a combination thereof similarly.

For further example, the cloud service module 720 can join the navigation local data 310 updated by the aggregate changeset data 354 to the navigation local data 310 without the update of the aggregate changeset data 354. For example, the navigation local data 310 for the home area 208 can be updated by the aggregate changeset data 354. In contrast, the navigation local data 310 outside of the home area 208 may not be updated. For a specific example, the travel route 224 can start within the home area 208 extending to outside of the home area 208. The cloud service module 720 can join the updated instance of the navigation local data 310 to the navigation local data 310 without the update so that the map data 326, the POI data 330, the geocoding data 328, the address data 332, the junction view data 334, the ADAS data 336, the landmark data 338, or a combination thereof can be consistent between the updated instance of the navigation local data 310 and the navigation local data 310 without the update.

For another example, the cloud service module 720 can update the navigation local data 310 based on the delta data 308 is below the delta threshold 312. As discussed above, the delta threshold 312 can be set at 20% for example. If the data difference 314 between the delta data 308 and the delta threshold 312 meets or exceeds the delta threshold 312, the cloud service module 720 can determine the update availability 404 as unavailable, thus, the navigation local data 310 is not updated with the aggregate changeset data 354. In contrast, if the data difference 314 is below the delta threshold 312, the cloud service module 720 can update the navigation local data 310 with the aggregate changeset data 354.

It has been discovered that the navigation system 100 determining the update availability 404 based on the comparison of the data difference 314 and the delta threshold 312 improvers the performance of the first device 102, the navigation system 100, or a combination thereof. By comparing the data difference 314 and the delta threshold 312 prior to updating, the navigation system 100 can ensure that the communication path 104 of FIG. 1 will not bottleneck, the first device 102 can handle the data size 390 of the aggregate changeset data 354, or a combination thereof. As a result, the first device 102, the navigation system 100, or a combination thereof will be left with additional computing resource to handle additional tasks, thus, improving the performance of the first device 102, the navigation system 100, or a combination thereof.

For a different example, the cloud service module 720 can update the navigation local data 310 based on the navigation session 228 of FIG. 2. More specifically as an example, if the navigation session 228 to guide the user with first device 102 is in session, the cloud service module 720 can prevent the aggregate changeset data 354 from being applied to the navigation local data 310. In contrast, if the navigation session 228 is not in session, the cloud service module 720 can update the navigation local data 310 with the aggregate changeset data 354.

For further example, the cloud service module 720 can update the navigation local data 310 based on the navigation session 228 related to the dimension type 346. For a specific example, the navigation session 228 can be in session for a specific instance of the spatial dimension 350 such as the home area 208. The cloud service module 720 can prevent the aggregate changeset data 354 from being applied to the home area 208 based on the navigation session 228 being in session. In contrast, the cloud service module 720 can update the navigation local data 310 for the other instance of the spatial dimension 350 because the navigation session 228 for the other instance spatial dimension 350 is not in session. For a different example, the layer dimension 348 representing a lake can be in session. The cloud service module 720 can prevent the aggregate changeset data 354 from being applied to the bounding box 202 including the layer dimension that is in session.

For a different example, the cloud service module 720 can update the navigation local data 310 based on the search session 230 of FIG. 2. More specifically as an example, if the search session 230 based on the user searching for the navigation guidance 226 of FIG. 2 is in session, the cloud service module 720 can prevent the aggregate changeset data 354 from being applied to the navigation local data 310. In contrast, if the search session 230 is not in session, the cloud service module 720 can update the navigation local data 310 with the aggregate changeset data 354.

For further example, the cloud service module 720 can update the navigation local data 310 based on the search session 230 related to the dimension type 346. For a specific example, the search session 230 can be in session for a specific instance of the spatial dimension 350 to search for the travel route 224 from the current location 220 of FIG. 2 to the category of interest 232 of FIG. 2. The cloud service module 720 can prevent the aggregate changeset data 354 from being applied to the special dimension based on the search session 230 being in session. In contrast, the cloud service module 720 can update the navigation local data 310 for the other instance of the spatial dimension 350 because the search session 230 for the other instance of the spatial dimension 350 is not in session.

It has been discovered that the navigation system 100 updating the navigation local data 310 based on the search session 230 improves the performance of the first device 102, the navigation system 100, or a combination thereof presenting the navigation guidance 226. By preventing the update if the search session 230 is in session, the navigation system 100 can seamlessly provide the navigation guidance 226 without abruptly ending the navigation guidance 226 while the user is making the request. As a result, the navigation system 100 can improve the performance of the first device 102, the navigation system 100, or a combination thereof delivering the navigation guidance 220 without interrupting the user's request.

For a different example, the cloud service module 720 can update the navigation local data 310 based on the layer prioritization 406 of FIG. 4. More specifically as an example, the cloud service module 720 can update the navigation local data 310 according to the layer prioritization 406 based on the comparison of the allowable bandwidth consumption 408 to the consumption threshold 410. For example, the layer prioritization 406 can indicate an order of priority from highest to priority to lowest priority in the following order: the map data 326, the POI data 330, the address data 332, the junction view data 334, the ADAS data 336, the landmark data 338, or a combination thereof. For further example, the layer prioritization 406 can indicate that an update to the home area 208 to have a higher priority than the geographic space 206 excluding the home area 208.

Continuing with the example, if the allowable bandwidth consumption 408 is below the consumption threshold 410, the cloud service module 720 can update the navigation local data 310 according to the layer prioritization 406 as discussed above. If the allowable bandwidth consumption 408 meets or exceeds the consumption threshold 410, the cloud service module 720 can update the navigation local data 310 without considering the layer prioritization 406 as discussed above.

For another example, the cloud service module 720 can update the navigation local data 310 based on the size type 364 of the aggregate changeset data 354, the data version 320, the allowable bandwidth consumption 408, the transmission cost 412, the transmission speed 416, or a combination thereof. More specifically as an example, the cloud service module 720 can apply the aggregate changeset data 354 including the incremental data 366, the bundle data 368, the complete data 370, or a combination thereof to update the navigation local data 310.

For further example, the data version 320 of the navigation local data 310 can become corrupt. Rather than applying the incremental data 366, the cloud service module 720 can update the navigation local data 310 by replacing the data version 320 that is corrupt with the uncorrupted instance of the complete data 370.

For a different example, the cloud service module 720 can update the navigation local data 310 based on a single feature of the aggregate changeset data 354. More specifically as an example, rather than updating the navigation local data 310 with multiple components of the data type 324, the dimension type 346, or a combination thereof, the cloud service module 720 can update the navigation local data 310 with a single instance of the navigation feature 218. The navigation feature 218 can be part of the incremental data 366 for updating the navigation local data 310. The cloud service module 720 can update the navigation local data 310 based on a single instance of the navigation feature 218 according to the allowable bandwidth consumption 408, the transmission cost 412, the transmission speed 416, or a combination thereof. The cloud service module 720 can transmit the aggregate changeset data 354 to an archiver module 724.

The data update service module 718 can include the local service module 722, which can be coupled to the cloud service module 720. The local service module 722 can check for the update availability 404. More specifically as an example, the local service module 722 can check for the update availability 404 for the size type 364, the changeset type 356, the dimension type 346, or a combination thereof.

For a specific example, the local service module 722 can check for the update availability 404 with the cloud service module 720. The cloud service module 720 can transmit the aggregate changeset data 354 with the size type 364 of the incremental data 366, the bundle data 368, the complete data 370, or a combination thereof. More specifically as an example, the local service module 722 can check for the update availability 404 for the bounding box 202. If the update availability 404 is "yes," the cloud service module 720 can transmit the aggregate changeset data 354 for the bounding box 202 with the size type 364 of the complete data 370 as an example.

The local service module 722 can publish the update notification 402 based on the update availability 404, the service type 372, the dimension type 346, the size type 364, the changeset type 356, or a combination thereof. More specifically as an example, each of the service type 372 can be registered to receive the update notification 402 when the update availability 404 indicates that the aggregate changeset data 354 for the changeset type 356 is available. The local service module 722 can publish the update notification 402 based on the update availability 404 indicating that the aggregate changeset data 354 for the changeset type 356 is available.

For further example, the local service module 722 can publish the update notification 402 based on the dimension type 346, the size type 364, the changeset type 356, or a combination thereof. More specifically as an example, each of the service type 372 can be registered to receive the update notification 402 when the update availability 404 indicates that the aggregate changeset data 354 for the dimension type 346 is available. For example, when the aggregate changeset data 354 for the layer dimension 348 is available, the local service module 722 can publish the update notification 402 for the layer dimension 348.

For further example, by publishing the update notification 402, each of the service type 372 can retrieve the aggregate changeset data 354 relevant for the given instance of the service type 372. For a specific example, the POI service 378 can retrieve the POI changeset data 362 for the POI data 330. For another example, the geocoding service 376 can retrieve the geocoding changeset data 360 for the geocoding data 328. For a different example, the map service 374 can retrieve the map changeset data 358 for the map data 326.

For further example, the local service module 722 can download the aggregate changeset data 354 from the cloud service module 720 based on the allowable bandwidth consumption 408. More specifically as an example, if the allowable bandwidth consumption 408 is below the consumption threshold 410, the local service module 722 can download the aggregate changeset data 354 with the size type 364 of the incremental data 366. For another example, if the allowable bandwidth consumption 408 meets the consumption threshold 410, the local service module 722 can download the aggregate changeset data 354 with the size type 364 of the bundle data 368. For different example, if the allowable bandwidth consumption 408 is above the consumption threshold 410, the local service module 722 can download the aggregate changeset data 354 with the size type 364 of the complete data 370.

For further example, the local service module 722 can download the aggregate changeset data 354 according to the changeset type 356 based on the allowable bandwidth consumption and the consumption threshold 410. As discussed, the changeset type 356 can include the map changeset data 358, the geocoding changeset data 360, the POI changeset data 362, the address changeset data 380, the junction view changeset data 382, the ADAS changeset data 384, the landmark changeset data 386, or a combination thereof. If the allowable bandwidth consumption 408 is below the consumption threshold 410, the local service module 722 can download the aggregate changeset data 354 with the one of the changeset type 356. For another example, if the allowable bandwidth consumption 408 meets the consumption threshold 410, the local service module 722 can download the aggregate changeset data 354 with more than one of the changeset type 356. For different example, if the allowable bandwidth consumption 408 is above the consumption threshold 410, the local service module 722 can download the aggregate changeset data 354 with all of the changeset type 356.

For additional example, the local service module 722 can download the aggregate changeset data 354 based on the transmission cost 412, the transmission speed 416, or a combination thereof. More specifically as an example, if the transmission cost 412 exceeds the cost threshold 414, the local service module 722 can download the aggregate changeset data 354 with the size type 364 of the incremental data 366. If the transmission cost 412 meets the cost threshold 414, the local service module 722 can download the aggregate changeset data 354 with the size type 364 of the bundle data 368. If the transmission cost 412 is below the cost threshold 414, the local service module 722 can download the aggregate changeset data 354 with the size type 364 of the complete data 370.

For further example, if the transmission speed 416 exceeds the speed threshold 418, the local service module 722 can download the aggregate changeset data 354 with the size type 364 of the complete data 370. If the transmission speed 416 meets the speed threshold 418, the local service module 722 can download the aggregate changeset data 354 with the size type 364 of the bundle data 368. If the transmission speed 416 is below the speed threshold 418, the local service module 722 can download the aggregate changeset data 354 with the size type 364 of the incremental data 366.

The local service module 722 can update the navigation local data 310 based on applying the aggregate changeset data 354 in a number of ways. For example, the local service module 722 can update the navigation local data 310 based on the data version 320. More specifically as an example, if the data version 320 of the navigation local data 310 is older than the aggregate changeset data 354, the local service module 722 can update the navigation local data 310 with the aggregate changeset data 354.

For a different example, the local service module 722 can update the navigation local data 310 based on the update availability 404 for each of the changeset type 356. More specifically as an example, if the changeset type 356 for the map changeset data 358 is available thus the delta data 308 is identified between the navigation external data 302 and the navigation local data 310, the local service module 722 can update the navigation local data 310 for the map data 326 without updating the other instance of the data type 324. The local service module 722 can update the navigation local data 310 for the POI data 330, the geocoding data 328, the address data 332, the junction view data 334, the ADAS data 336, the landmark data 338, or a combination thereof similarly.

For further example, the local service module 722 can join the navigation local data 310 updated by the aggregate changeset data 354 to the navigation local data 310 without the aggregate changeset data 354 being applied. For example, the navigation local data 310 for the home area 208 can be updated by the aggregate changeset data 354. In contrast, the navigation local data 310 outside of the home area 208 may not be updated. For a specific example, the travel route 224 can start within the home area 208 extending to outside of the home area 208. The local service module 722 can join the updated instance of the navigation local data 310 to the navigation local data 310 without the update so that the map data 326, the POI data 330, the geocoding data 328, the address data 332, the junction view data 334, the ADAS data 336, the landmark data 338, or a combination thereof can be consistent between the updated instance of the navigation local data 310 and the navigation local data 310 without the update.

For another example, the local service module 722 can update the navigation local data 310 based on the delta data 308 is below the delta threshold 312. As discussed above, the delta threshold 312 can be set at 20% for example. If the data difference 314 meets or exceeds the delta threshold 312, the local service module 722 can determine the update availability 404 as unavailable, thus, the navigation local data 310 is not updated with the aggregate changeset data 354. In contrast, if the data difference 314 is below the delta threshold 312, the local service module 722 can update the navigation local data 310 with the aggregate changeset data 354.

It has been discovered that the navigation system 100 determining the update availability 404 based on the comparison of the data difference 314 and the delta threshold 312 improvers the performance of the first device 102, the navigation system 100, or a combination thereof. By comparing the data difference 314 and the delta threshold 312 prior to updating, the navigation system 100 can ensure that the communication path 104 of FIG. 1 will not bottleneck, the first device 102 can handle the data size 390 of the aggregate changeset data 354, or a combination thereof. As a result, the first device 102, the navigation system 100, or a combination thereof will be left with additional computing resource to handle additional tasks, thus, improving the For a different example, the local service module 722 can update the navigation local data 310 based on the navigation session 228. More specifically as an example, if the navigation session 228 to guide the user with first device 102 is in session, the local service module 722 can prevent the aggregate changeset data 354 from being applied to the navigation local data 310. In contrast, if the navigation session 228 is not in session, the local service module 722 can update the navigation local data 310 with the aggregate changeset data 354.

For further example, the local service module 722 can update the navigation local data 310 based on the navigation session 228 related to the dimension type 346. For a specific example, the navigation session 228 can be in session for a specific instance of the spatial dimension 350 such as the home area 208. The local service module 722 can prevent the aggregate changeset data 354 from being applied to the home area 208 based on the navigation session 228 being in session. In contrast, the local service module 722 can update the navigation local data 310 for the other instance of the spatial dimension 350 because the navigation session 228 for the other instance spatial dimension 350 is not in session. For a different example, the layer dimension 348 representing a lake can be in session. The local service module 722 can prevent the aggregate changeset data 354 from being applied to the bounding box 202 including the layer dimension that is in session.

For a different example, the local service module 722 can update the navigation local data 310 based on the search session 230. More specifically as an example, if the search session 230 based on the user searching for the navigation guidance 226 is in session, the local service module 722 can prevent the aggregate changeset data 354 from being applied to the navigation local data 310. In contrast, if the search session 230 is not in session, the local service module 722 can update the navigation local data 310 with the aggregate changeset data 354.

For further example, the local service module 722 can update the navigation local data 310 based on the search session 230 related to the dimension type 346. For a specific example, the search session 230 can be in session for a specific instance of the spatial dimension 350 to search for the travel route 224 of FIG. 2 from the current location 220 to the target destination 222 of FIG. 2. The local service module 722 can prevent the aggregate changeset data 354 from being applied to the special dimension based on the search session 230 being in session. In contrast, the local service module 722 can update the navigation local data 310 for the other instance of the spatial dimension 350 because the search session 230 for the other instance of the spatial dimension 350 is not in session.

It has been discovered that the navigation system 100 updating the navigation local data 310 based on the search session 230 improves the performance of the first device 102, the navigation system 100, or a combination thereof presenting the navigation guidance 226. By preventing the update if the search session 230 is in session, the navigation system 100 can seamlessly provide the navigation guidance 226 without abruptly ending the navigation guidance 226 while the user is making the request. As a result, the navigation system 100 can improve the performance of the first device 102, the navigation system 100, or a combination thereof delivering the navigation guidance 220 without interrupting the user's request.

For a different example, the local service module 722 can update the navigation local data 310 based on the layer prioritization 406. More specifically as an example, the local service module 722 can update the navigation local data 310 according to the layer prioritization 406 based on the comparison of the allowable bandwidth consumption 408 to the consumption threshold 410. For example, the layer prioritization 406 can indicate an order of priority from highest to priority to lowest priority in the following order: the map data 326, the POI data 330, the address data 332, the junction view data 334, the ADAS data 336, the landmark data 338, or a combination thereof. For further example, the layer prioritization 406 can indicate that an update to the home area 208 to have a higher priority than the geographic space 206 other than the home area 208.

Continuing with the example, if the allowable bandwidth consumption 408 is below the consumption threshold 410, the local service module 722 can update the navigation local data 310 according to the layer prioritization 406 as discussed above. If the allowable bandwidth consumption 408 meets or exceeds the consumption threshold 410, the local service module 722 can update the navigation local data 310 without considering the layer prioritization 406 as discussed above.

For another example, the local service module 722 can update the navigation local data 310 based on the size type 364 of the aggregate changeset data 354, the data version 320, the allowable bandwidth consumption 408, or a combination thereof. More specifically as an example, the local service module 722 can apply the aggregate changeset data 354 including the incremental data 366, the bundle data 368, the complete data 370, or a combination thereof to update the navigation local data 310.

For further example, the data version 320 of the navigation local data 310 can become corrupt. Rather than applying the incremental data 366, the local service module 722 can update the navigation local data 310 by replacing the data version 320 that is corrupt with the uncorrupted instance of the complete data 370.

For a different example, the local service module 722 can update the navigation local data 310 based on a single feature of the aggregate changeset data 354. More specifically as an example, rather than updating the navigation local data 310 with multiple components of the data type 324, the dimension type 346, or a combination thereof, the local service module 722 can update the navigation local data 310 with a single instance of the navigation feature 218. The navigation feature 218 can be part of the incremental data 366 for updating the navigation local data 310. The local service module 722 can update the navigation local data 310 based on a single instance of the navigation feature 218 according to the allowable bandwidth consumption 408, the transmission cost 412, the transmission speed 416, or a combination thereof. The local service module 722 can transmit the aggregate changeset data 354 to an archiver module 724. The local service module 722 can transmit the aggregate changeset data 354 to an archiver module 724.

The navigation system 100 can include an archiver module 724, which can be coupled to the data update service module 718. The archiver module 724 stores the aggregate changeset data 354. For example, the archiver module 724 can store the aggregate changeset data 354 by indexing the aggregate changeset data 354 in the first storage unit 614, the second storage unit 646, or a combination thereof.

The archiver module 724 can store the aggregate changeset data 354 in a number of ways. For example, the archiver module 724 can index the aggregate changeset data 354 based on the size type 364. More specifically as an example, the archiver module 724 can index the aggregate changeset data 354 based on the incremental data 366, the bundle data 368, the complete data 370, or a combination thereof. For further example, the archiver module 724 can index the aggregate changeset data 354 based on the size type 364, the changeset type 356, the dimension type 346, or a combination thereof.

For a different example, the archiver module 724 can hash the aggregate changeset data 354. More specifically as an example, by creating the cryptographic hash, for example, SHA-256/512, for the aggregate changeset data 354, the archiver module 724 can generate the aggregate changeset data 354 to ensure the integrity and the tamper-resistant instance of the aggregate changeset data 354.

For another example, the archiver module 724 can rollup the aggregate changeset data 354 periodically. More specifically as an example, the archiver module 724 can rollup the aggregate changeset data 354 where the data size 390 can be saved significantly. For a different example, the archiver module 724 can backup and restore the aggregate changeset data 354. More specifically as an example, the archiver module 724 can back up the aggregate changeset data 354 including the metadata.

The navigation system 100 can include a presenter module 726, which can be coupled to the data update service module 718. The presenter module 726 presents the navigation local data 310 updated. For example, the presenter module 726 can display the navigation local data 310 with the dimension type 346 of the spatial dimension 350 representing the home area 208 being updated by the map changeset data 358.

The physical transformation from traveling from one instance of the bounding box 202 to another instance of the bounding box 202 by traversing along the travel route 224 results in the movement in the physical world, such as people using the first device 102, the vehicle, or a combination thereof, based on the operation of the navigation system 100. As the movement in the physical world occurs, the movement itself creates additional information that is transformed from physical aspect to digital data for further generation of the aggregate changeset data 354 to update the navigation local data 310 to provide the navigation guidance 226 for the continued operation of the navigation system 100 and to continue the movement in the physical world.

The first software 626 of FIG. 6 of the first device 102 of FIG. 6 can include the modules for the navigation system 100. For example, the first software 626 can include the box module 702, the data load module 704, the diff generation module 706, the aggregation module 708, the unified module 714, the optimization module 716, the data update service module 718, the archiver module 724, and the presenter module 726. The first control unit 612 of FIG. 6 can execute the modules to perform the functions dynamically and in real time.

The first control unit 612 can execute the first software 626 for the box module 702 to calculate the bounding box 202. The first control unit 612 can execute the first software 626 for the data load module 704 to receive the navigation external data 302. The first control unit 612 can execute the first software 626 for the diff generation module 706 to compute the data difference 314.

The first control unit 612 can execute the first software 626 for the aggregation module 708 to generate the normalization data 344. The first control unit 612 can execute the first software 626 for the unified module 714 to store the normalization data 344. The first control unit 612 can execute the first software 626 for the optimization module 716 to generate the aggregate changeset data 354.

The first control unit 612 can execute the first software 626 for the data update service module 718 to update the navigation local data 310. The first control unit 612 can execute the first software 626 for the archiver module 724 to store the aggregate changeset data 354. The first control unit 612 can execute the first software 626 for the presenter module 726 to present the updated instance of the navigation local data 310.

The second software 642 of FIG. 6 of the first device 102 of FIG. 6 can include the modules for the navigation system 100. For example, the second software 642 can include the box module 702, the data load module 704, the diff generation module 706, the aggregation module 708, the unified module 714, the optimization module 716, the data update service module 718, the archiver module 724, and the presenter module 726. The second control unit 634 of FIG. 6 can execute the modules to perform the functions dynamically and in real time.

The second control unit 634 can execute the second software 642 for the box module 702 to calculate the bounding box 202. The second control unit 634 can execute the second software 642 for the data load module 704 to receive the navigation external data 302. The second control unit 634 can execute the second software 642 for the diff generation module 706 to compute the data difference 314.

The second control unit 634 can execute the second software 642 for the aggregation module 708 to generate the normalization data 344. The second control unit 634 can execute the second software 642 for the unified module 714 to store the normalization data 344. The second control unit 634 can execute the second software 642 for the optimization module 716 to generate the aggregate changeset data 354.

The second control unit 634 can execute the second software 642 for the data update service module 718 to update the navigation local data 310. The second control unit 634 can execute the second software 642 for the archiver module 724 to store the aggregate changeset data 354. The second control unit 634 can execute the second software 642 for the presenter module 726 to present the updated instance of the navigation local data 310.

The modules of the navigation system 100 can be partitioned between the first software 626 and the second software 642. The second software 642 can include the box module 702, the data load module 704, the diff generation module 706, the aggregation module 708, the unified module 714, the optimization module 716, the data update service module 718, and the archiver module 724. The second control unit 634 can execute modules partitioned on the second software 642 as previously described.

The first software 626 can include the presenter module 726. Based on the size of the first storage unit 614, the first software 626 can include additional modules of the navigation system 100. The first control unit 612 can execute the modules partitioned on the first software 626 as previously described. For a different example, the second software 642 can include the box module 702, the data load module 704, the diff generation module 706, the aggregation module 708, the unified module 714, and the optimization module 716. The first software 626 can include the presenter module 726, the data update service module 718, and the archiver module 724.

It has been discovered that the navigation system 100 having different configuration of a distributed architecture to actuate each module on the first device 102 or the second device 106 enhances the capability of the navigation system 100 to receive the navigation external data 302, generate the aggregate changeset data 354, and update the navigation local data 310. By having the distributed architecture, the navigation system 100 can enable load distribution of receiving the navigation external data 302, transmitting the aggregate changeset data 354, or a combination thereof to reduce congestion in bottleneck in the communication path 104 of FIG. 6 and enhance accessibility of the aggregate changeset data 354 in the cloud resource or local resource to efficiently update the navigation local data 310. As a result, the navigation system 100 can improve the performance to update the navigation local data 310 to present the accurate instance of the navigation local data 310 more rapidly for safer operation of the first device 102, the vehicle, or a combination thereof.

The first control unit 612 can operate the first communication unit 616 of FIG. 6 to transmit the bounding box 202, the navigation external data 302, the data difference 314, the normalization data 344, the aggregate changeset data 354, the navigation local data 310, or a combination thereof to or from the second device 106 through the communication path 104. The first control unit 612 can operate the first software 626 to operate the location unit 620 of FIG. 6. The second control unit 634 can operate the second communication unit 636 of FIG. 6 to transmit the bounding box 202, the navigation external data 302, the data difference 314, the normalization data 344, the aggregate changeset data 354, the navigation local data 310, or a combination thereof to or from the first device 102 through the communication path 104.

The navigation system 100 describes the module functions or order as an example. The modules can be partitioned differently. For example, the data update service module 718 and the archiver module 724 can be combined. Each of the modules can operate individually and independently of the other modules. Furthermore, data generated in one module can be used by another module without being directly coupled to each other. For example, the aggregation module 708 can receive the bounding box 202 from the box module 702. Further, one module transmitting to another module can represent one module communicating, sending, receiving, or a combination thereof the data generated to or from another module.

The modules described in this application can be hardware implementation or hardware accelerators in the first control unit 612 or in the second control unit 634. The modules can also be hardware implementation or hardware accelerators within the first device 102 or the second device 106 but outside of the first control unit 612 or the second control unit 634, respectively as depicted in FIG. 6. However, it is understood that the first control unit 612, the second control unit 634, or a combination thereof can collectively refer to all hardware accelerators for the modules. Furthermore, the first control unit 612, the second control unit 634, or a combination thereof can be implemented as software, hardware, or a combination thereof.

The modules described in this application can be implemented as instructions stored on a non-transitory computer readable medium to be executed by the first control unit 612, the second control unit 634, or a combination thereof. The non-transitory computer medium can include the first storage unit 614, the second storage unit 646 of FIG. 6, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 8:
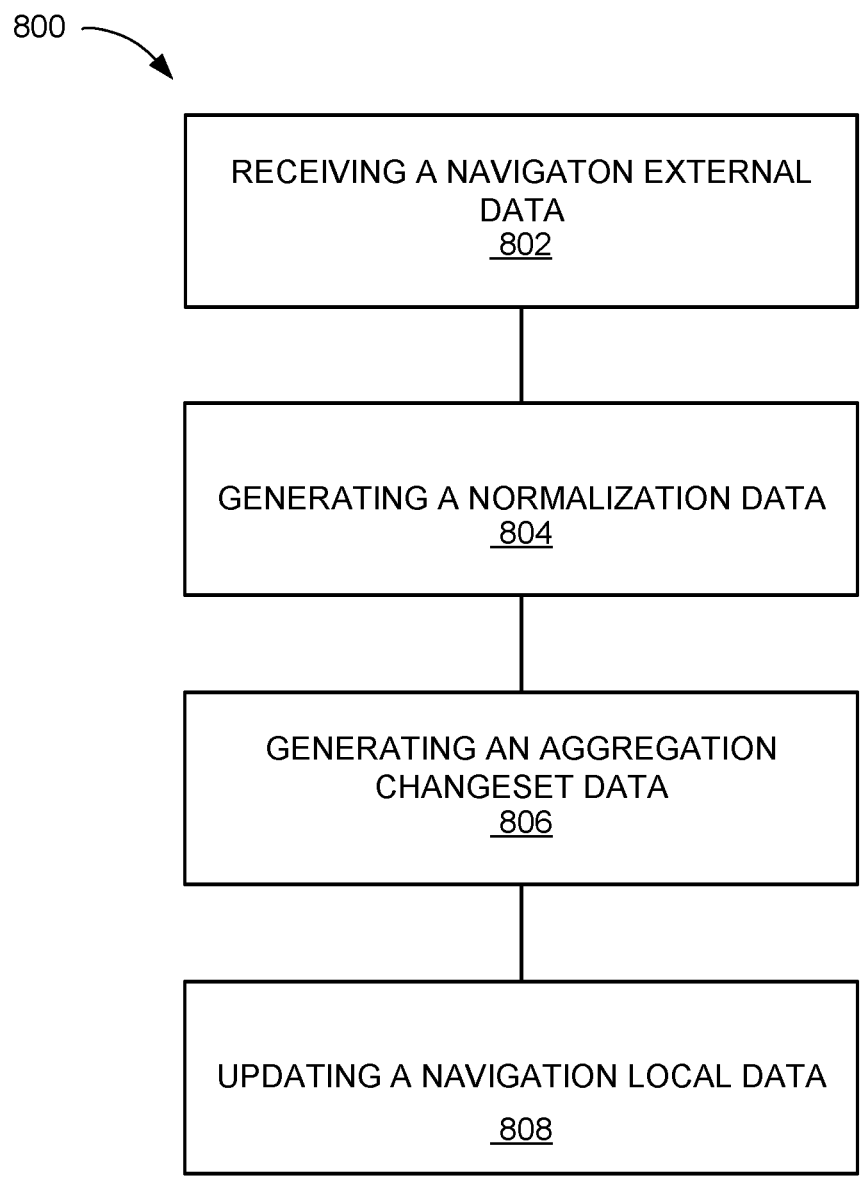
FIG. 8 is a flow chart of a method of operation of the navigation system in a further embodiment of the present invention.

Referring now to FIG. 8, therein is shown a flow chart of a method 800 of operation of the navigation system 100 in a further embodiment of the present invention. The method 800 includes: receiving a navigation external data including a vendor data, a delta data, or a combination thereof in a block 802; generating a normalization data with a control unit based on transforming the navigation external data according to universal format in a block 804; generating an aggregation changeset data by splitting the normalization data into each instance of a dimension type in a block 806; and updating a navigation local data by applying the aggregation changeset data according to a layer prioritization for presenting the navigation local data on a device in a block 808.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   receiving a navigation external data including a vendor data, a delta data, or a combination thereof;
   generating a deduplicated data based on eliminating a redundant instance of the navigation external data;
   generating a normalization data with a control unit including a processor based on the deduplicated data to transform the navigation external data according to universal format;
   generating an aggregation changeset data based on splitting the normalization data into each instance of a dimension type and determining if a data difference meets or exceeds a delta threshold; and
   updating a navigation local data by applying the aggregation changeset data according to a layer prioritization wherein the layer prioritization indicates an order of priority to deliver a data type.

2. The method as claimed in claim 1 further comprising downloading the aggregation changeset data based on comparing an allowable bandwidth consumption to a consumption threshold.

3. The method as claimed in claim 1 wherein updating the navigation local data includes updating the navigation local data based on an update availability for each of a changeset type.

4. The method as claimed in claim 1 wherein updating the navigation local data includes updating the navigation local data based on the delta data below the delta threshold.

5. The method as claimed in claim 1 further comprising computing the data difference by identifying the delta data between the navigation external data and the navigation local data.

6. The method as claimed in claim 1 further comprising preventing the aggregation changeset data from being applied to the navigation local data based on a navigation session is in session.

7. The method as claimed in claim 1 further comprising preventing the aggregation changeset data from being applied to the navigation local data based on a search session is in session.

8. The method as claimed in claim 1 further comprising downloading the aggregation changeset data according to a changeset type based on comparing an allowable bandwidth consumption to a consumption threshold.

9. The method as claimed in claim 1 further comprising downloading the aggregation changeset data based on comparing a transmission speed to a speed threshold.

10. The method as claimed in claim 1 further comprising downloading the aggregation changeset data based on a transmission cost to a cost threshold.

11. A navigation system comprising:
    a communication unit including microelectronics configured to receive a navigation external data including a vendor data, a delta data, or a combination thereof; and
    a control unit including a processor, coupled to the communication unit, configured to:
       generate a deduplicated data based on eliminating a redundant instance of the navigation external data;
       generate a normalization data based on the deduplicated data to transform the navigation external data according to universal format;
       generate an aggregation changeset data based on splitting the normalization data into each instance of a dimension type and determining if a data difference meets or exceeds a delta threshold; and
       update a navigation local data by applying the aggregation changeset data according to a layer prioritization wherein the layer prioritization indicates an order of priority to deliver a data type for presenting the navigation local data on a device.

12. The system as claimed in claim 11 wherein the control unit is configured to download the aggregation changeset data based on comparing an allowable bandwidth consumption to a consumption threshold.

13. The system as claimed in claim 11 wherein the control unit is configured to update the navigation local data based on an update availability for each of a changeset type.

14. The system as claimed in claim 11 wherein the control unit is configured to update the navigation local data based on the delta data below the delta threshold.

15. The system as claimed in claim 11 wherein the control unit is configured to update the navigation local data based on the delta data below the delta threshold.

16. A non-transitory computer readable medium including instructions executed by a processor, the instructions comprising:
    receiving a navigation external data including a vendor data, a delta data, or a combination thereof;
    generating a deduplicated data based on eliminating a redundant instance of the navigation external data;
    generating a normalization data based on the deduplicated data to transform the navigation external data according to universal format;
    generating an aggregation changeset data based on splitting the normalization data into each instance of a dimension type and determining if the data difference meets or exceeds a delta threshold; and
    updating a navigation local data by applying the aggregation changeset data according to a layer prioritization wherein the layer prioritization indicates an order of priority to deliver a data type.

17. The non-transitory computer readable medium as claimed in claim 16 further comprising downloading the aggregation changeset data based on comparing an allowable bandwidth consumption to a consumption threshold.

18. The non-transitory computer readable medium as claimed in claim 16 wherein updating the navigation local data includes updating the navigation local data based on an update availability for each of a changeset type.

19. The non-transitory computer readable medium as claimed in claim 16 wherein updating the navigation local data includes updating the navigation local data based on the delta data below the delta threshold.

20. The non-transitory computer readable medium as claimed in claim 16 further comprising computing the data difference by identifying the delta data between the navigation external data and the navigation local data.

* * * * *